(12) United States Patent
Suzuki et al.

(10) Patent No.: US 11,994,045 B2
(45) Date of Patent: May 28, 2024

(54) HYDRAULIC OIL CONTROL VALVE AND VALVE TIMING ADJUSTMENT DEVICE

(71) Applicant: DENSO CORPORATION, Kariya (JP)

(72) Inventors: Tomonori Suzuki, Kariya (JP); Futoshi Kawamura, Kariya (JP); Kinya Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 17/949,692

(22) Filed: Sep. 21, 2022

(65) Prior Publication Data

US 2023/0014627 A1 Jan. 19, 2023

Related U.S. Application Data

(63) Continuation of application No. PCT/JP2021/010373, filed on Mar. 15, 2021.

(30) Foreign Application Priority Data

Mar. 23, 2020 (JP) ................. 2020-050495

(51) Int. Cl.
*F01L 1/34* (2006.01)
*F01L 1/344* (2006.01)
*F16K 11/07* (2006.01)

(52) U.S. Cl.
CPC ........ *F01L 1/3442* (2013.01); *F16K 11/0716* (2013.01); *F01L 2001/3443* (2013.01)

(58) Field of Classification Search
CPC ............ F01L 1/3442; F01L 2001/3443; F16K 11/0716; F16K 11/07; F16K 27/041; F16K 2200/304; F16K 2200/30
See application file for complete search history.

(56) References Cited

U.S. PATENT DOCUMENTS

| 11,131,221 B1* | 9/2021 | Burke .................... F01L 1/344 |
| 2007/0023722 A1* | 2/2007 | Oishi ................. F16K 31/0613 |
| | | 137/625.69 |
| 2013/0112163 A1 | 5/2013 | Bayrakdar |
| 2018/0100595 A1 | 4/2018 | Fanzani et al. |

(Continued)

FOREIGN PATENT DOCUMENTS

| CN | 105019961 | 11/2015 |
| DE | 10 2015 219 242 | 4/2017 |
| DE | 10 2016 200 788 | 7/2017 |

(Continued)

*Primary Examiner* — Kelsey E Cary
(74) *Attorney, Agent, or Firm* — Nixon & Vanderhye P.C.

(57) ABSTRACT

A hydraulic oil control valve includes a sleeve, a spool and a spring. The spool is received at an inside of the sleeve and is configured to be reciprocated. The spring is configured to be seated against a spring seat of the sleeve and is configured to apply a preload to the spool. The sleeve has a stepped portion, which has a spool contact surface for limiting movement of the spool toward the spring seat, and a protrusion, which is located at a center of the spring seat and protrudes toward an opening of the sleeve. The protrusion has a sloped peripheral surface. The protrusion is configured such that in a state where an end portion of the spring is not seated against the spring seat while the spring is placed adjacent to the spring seat, the end portion of the spring contacts the protrusion.

10 Claims, 14 Drawing Sheets

(56) References Cited

U.S. PATENT DOCUMENTS

2020/0011215 A1    1/2020   Thomas et al.
2020/0114479 A1*   4/2020   Ueno .................. F16K 31/0613

FOREIGN PATENT DOCUMENTS

| DE | 10 2016 202 855 | 8/2017 |
| DE | 10 2016 203 484 | 9/2017 |
| DE | 10 2016 203 485 | 9/2017 |
| DE | 10 2017 123 352 | 4/2019 |

* cited by examiner

HYDRAULIC OIL CONTROL VALVE AND VALVE TIMING ADJUSTMENT DEVICE

CROSS REFERENCE TO RELATED APPLICATIONS

This application is a continuation application of International Patent Application No. PCT/JP2021/010373 filed on Mar. 15, 2021, which designated the U.S. and claims the benefit of priority from Japanese Patent Application No. 2020-050495 filed on Mar. 23, 2020. The entire disclosures of all of the above applications are incorporated herein by reference.

TECHNICAL FIELD

The present disclosure relates to a hydraulic oil control valve and a valve timing adjustment device.

BACKGROUND

Previously, there has been proposed a hydraulic valve timing adjustment device that is configured to adjust a valve timing of intake valves or exhaust valves of an internal combustion engine. In one such valve timing adjustment device, a spring is installed in a sleeve to apply a preload between a bottom of the sleeve and a spool while a protrusion is formed at the bottom of the sleeve.

SUMMARY

This section provides a general summary of the disclosure, and is not a comprehensive disclosure of its full scope or all of its features.

According to the present disclosure, there is provided a hydraulic oil control valve that includes a sleeve, a spool and a spring. The sleeve is shaped in a cylindrical tubular form. An opening is formed at one end portion of the sleeve, and a spring seat is formed at another end portion of the sleeve. The spool is configured to move forward and backward in an inside of the sleeve. The spring is configured to be seated against the spring seat of the sleeve and is configured to apply a preload to the spool. The spring has a first end portion, which has an outer diameter and an inner diameter that are set to enable the first end portion to seat against the spring seat, and a second end portion, which is spaced from the first end portion. The sleeve has a stepped portion and a protrusion. The stepped portion surrounds the spring seat on a radially outer side of the spring seat and has a spool contact surface that is configured to limit movement of the spool toward the spring seat. The protrusion is located at a center of the spring seat and protrudes toward the opening, wherein a maximum diameter of the protrusion is smaller than the inner diameter of the first end portion of the spring, and the protrusion has a sloped peripheral surface that has an outer diameter which is progressively reduced from one side of the sloped peripheral surface, at which the spring seat is placed, toward the opening. The protrusion is configured such that in a state where the first end portion is not seated against the spring seat of the sleeve while the spring is placed adjacent to the spring seat, the first end portion is placed in contact with the protrusion.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
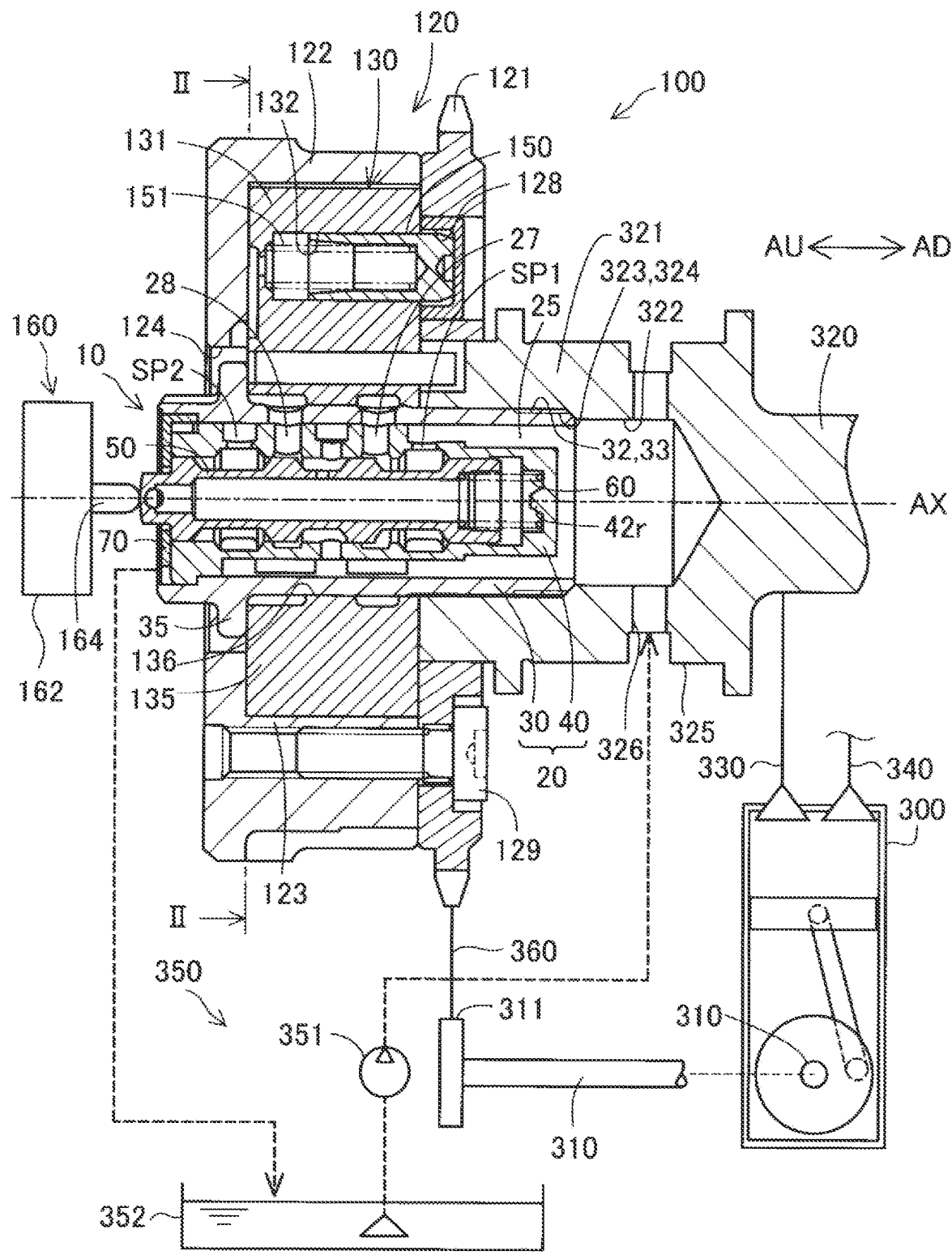
FIG. 1 is a cross-sectional view showing a schematic structure of a valve timing adjustment device including a hydraulic oil control valve according to a first embodiment.

Previously, there has been proposed a hydraulic valve timing adjustment device that is configured to adjust a valve timing of intake valves or exhaust valves of an internal combustion engine. In one such valve timing adjustment device, a spring is installed in a sleeve to apply a preload between a bottom of the sleeve and a spool while a protrusion is formed at the bottom of the sleeve.

At the time of manufacturing the valve timing adjustment device of the above-described type, the sleeve is placed upright, so that an opening of the sleeve faces up in the direction of gravity, and the spring is dropped from the opening to insert the spring into an inside of the sleeve. At this time, if the spring is dropped in a state where the spring is tilted, the spring may not be installed in the correct position thereof in the sleeve. In such a case, the spring is removed from the sleeve and is then reinserted into the sleeve. Therefore, the productivity may be deteriorated. It is conceivable to have another installing method of the spring. Specifically, a cylindrical jig, which has an opening having a diameter slightly larger than a diameter of the spring, is inserted into the sleeve. Then, the spring may be dropped straight into the jig, and thereafter the jig may be removed from the sleeve. However, this will adds the step of inserting the jig and the step of removing the jig to the manufacturing process. Therefore, the productivity may be deteriorated. Furthermore, the method of gripping and inserting the spring with the jig to place the spring in position will result in complications for the production equipment.

The present disclosure can be implemented as follows.

According to one aspect of the present disclosure, there is provided a hydraulic oil control valve configured to control a hydraulic oil pressure of hydraulic oil to be supplied to a valve timing adjustment device that is configured to adjust an opening timing and a closing timing of a valve of an internal combustion engine.

The hydraulic oil control valve includes:
a sleeve that is shaped in a cylindrical tubular form, wherein an opening is formed at one end portion of the sleeve, and a spring seat is formed at another end portion of the sleeve;
a spool that is configured to move forward and backward in an inside of the sleeve, wherein the spool is configured to adjust a supply destination of the hydraulic oil according to a positional relationship between the spool and the sleeve;
an actuator that contacts the spool and is configured to drive the spool toward the spring seat; and
a spring that is configured to be seated against the spring seat of the sleeve and is configured to apply a preload to the spool toward the actuator, wherein the spring has a first end portion, which has an outer diameter and an inner diameter that are set to enable the first end portion to seat against the spring seat, and a second end portion, which is spaced from the first end portion by a free length of the spring, wherein:
the sleeve has:
a stepped portion, which surrounds the spring seat on a radially outer side of the spring seat and has a spool contact surface that is configured to limit movement of the spool toward the spring seat; and
a protrusion, which is located at a center of the spring seat and protrudes toward the opening, wherein a maximum diameter of the protrusion is smaller than the inner diameter of the first end portion of the spring, and the protrusion has a sloped peripheral surface that has an outer diameter which is progressively reduced from one side of the sloped peripheral surface, at which the spring seat is placed, toward the opening; and
the protrusion is configured such that in a state where the first end portion is not seated against the spring seat of the sleeve while the spring is placed adjacent to the spring seat, the first end portion is placed in contact with the protrusion.

According to the above aspect, the protrusion, which is located at the bottom of the sleeve, is configured such that in a state where the first end portion is not seated against the spring seat of the sleeve while the spring is placed adjacent to the spring seat, the first end portion is placed in contact with the protrusion. With this configuration of the protrusion, the first end portion, which is placed in contact with the protrusion, can be dropped from the protrusion along the sloped peripheral surface to the spring seat to correctly place the spring at the spring seat.

Hereinafter, embodiments of the present disclosure will be described with reference to the drawings.

A. First Embodiment (A-1. Device Structure)

An internal combustion engine 300 of a vehicle (not shown) opens and closes intake valves (serving as valves) 330 and exhaust valves (serving as valves) 340 through a corresponding one of camshafts 320 (only one of the camshafts 320 is shown in FIG. 1) that receive a drive force from a crankshaft 310. The valve timing adjustment device 100 shown in FIG. 1 is installed in a drive force transmission path extending from the crankshaft 310 to the camshaft 320 and adjusts an opening timing and a closing timing of each of the valves 330, 340 by changing a phase of the camshaft 320 relative to the crankshaft 310. More specifically, the valve timing adjustment device 100 is fixed to an end portion 321 of the camshaft 320 in an axial direction of a rotational axis AX of the camshaft 320. The rotational axis AX of the valve timing adjustment device 100 coincides with the rotational axis AX of the camshaft 320. The valve timing adjustment device 100 of the present embodiment adjusts the opening timing and the closing timing of the intake valves 330 among the intake valves 330 and the exhaust valves 340, which serve as the valves.

The valve timing adjustment device 100 includes: a housing 120; a vane rotor 130 installed at an inside of the housing 120; and a hydraulic oil control valve 10. The hydraulic oil control valve 10 includes: an outer sleeve 30; an inner sleeve 40 located on an inner side of the outer sleeve 30; and a spool 50 that is located at an inside of the inner sleeve 40 and is configured to reciprocate forward and backward along the rotational axis AX of the outer sleeve 30. The outer sleeve 30 and the inner sleeve 40 are assembled together and form a plurality of ports 27, 28. The hydraulic oil control valve 10 supplies the hydraulic oil to a gap between the housing 120 and the vane rotor 130 through at least one of the ports 27, 28 according to a position of the spool 50 in the inside of the inner sleeve 40 and thereby changes a phase between the housing 120 and the vane rotor 130 to adjust the valve timing.

A shaft hole 322 is formed at a center of the end portion 321 of the camshaft 320, and a supply hole 326 is formed at an outer peripheral surface of the end portion 321 of the camshaft 320. The shaft hole 322 extends along the rotational axis AX. A shaft fixing portion 323 for fixing the hydraulic oil control valve 10 is formed at an inner peripheral surface of the shaft hole 322. A female-threaded portion 324 is formed at the shaft fixing portion 323. The female-threaded portion 324 is threadably engaged with a male-threaded portion 33 that is formed at a fixing portion 32 of the hydraulic oil control valve 10. The supply hole 326 extends in a radial direction of the camshaft 320 and communicates between an outer peripheral surface 325 of the camshaft 320 and the shaft hole 322. An oil reservoir (not shown) is formed at the outer peripheral surface 325. The hydraulic oil, which is supplied from the hydraulic oil supply source 350, is supplied from the oil reservoir to the hydraulic oil control valve 10 through the supply hole 326 and the shaft hole 322. The hydraulic oil supply source 350 includes an oil pump 351 and an oil pan 352. The oil pump 351 suctions the hydraulic oil stored in the oil pan 352.

The housing 120 includes a sprocket 121 and a case 122. The sprocket 121 is rotatably fitted to the end portion 321 of the camshaft 320. A fitting recess 128 is formed at the sprocket 121 at a location that corresponds to a lock pin 150 described later. A timing chain 360, which is shaped in a ring form, is wound around the sprocket 121 and a sprocket 311 of the crankshaft 310. The sprocket 121 is fixed to the case 122 by a plurality of bolts 129. Therefore, the housing 120 is rotated synchronously with the crankshaft 310. The case 122 is shaped in a bottomed tubular form, and an opening end of the case 122 is closed by the sprocket 121. An opening 124 is formed at a center of a bottom portion of the case 122 which is opposite from the sprocket 121.

Figure 2:
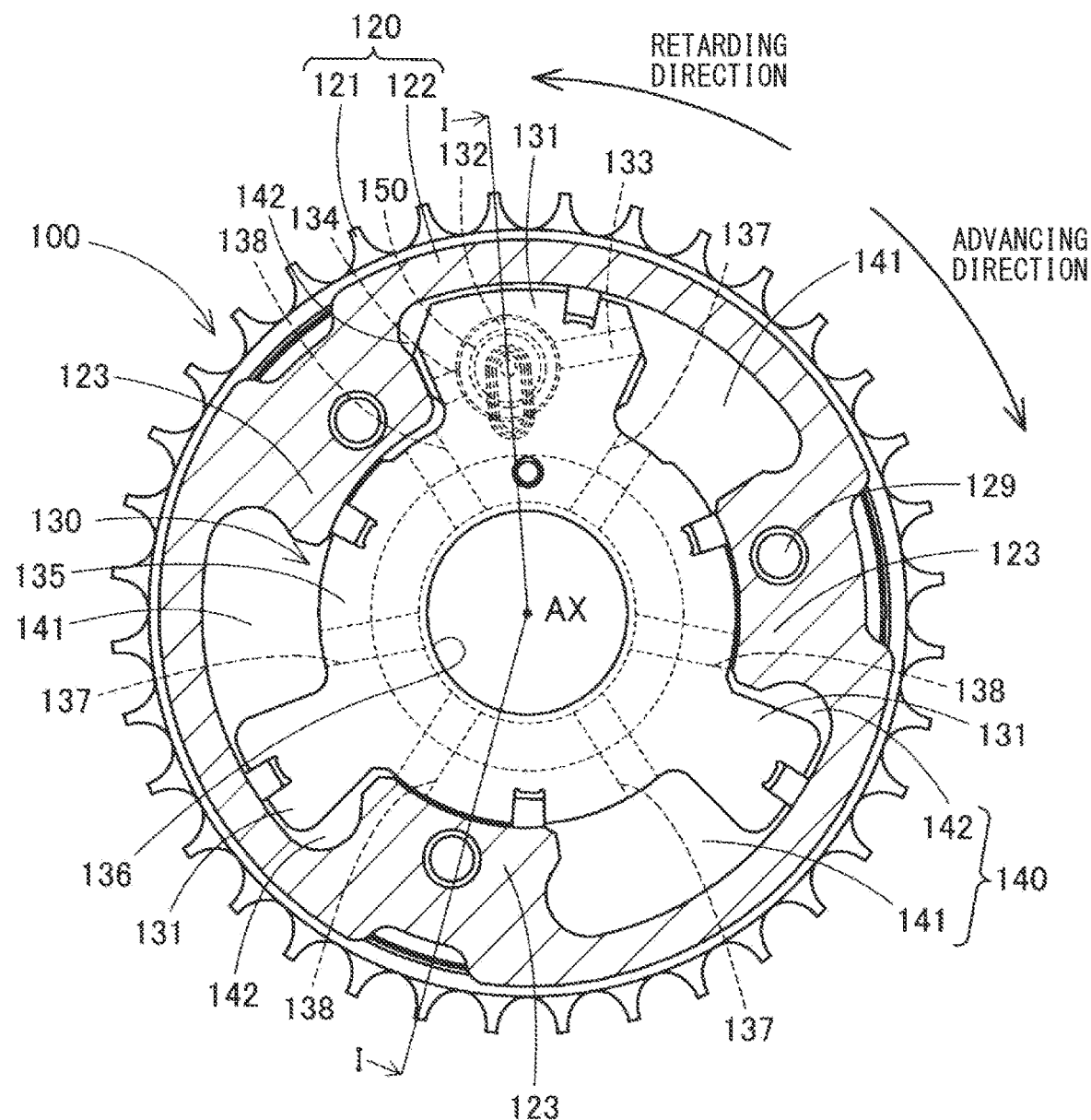
FIG. 2 is a cross-sectional view showing a cross section taken along the line II-II in FIG. 1.

As shown in FIG. 2, the case 122 has a plurality of partition wall portions 123 which project radially inward and are arranged one after another in a circumferential direction. In FIG. 2, indication of the hydraulic oil control valve 10 is omitted for the sake of simplicity. A space, which is formed between each adjacent two of the partition wall portions 123, functions as a hydraulic oil chamber 140.

The vane rotor 130 is received at an inside of the housing 120 and is rotated in a retarding direction or an advancing direction relative to the housing 120 according to a hydraulic oil pressure of the hydraulic oil which is supplied from the hydraulic oil control valve 10 through a plurality of retard oil passages 137 or a plurality of advance oil passages 138. Therefore, the vane rotor 130 functions as a phase changing portion that changes a phase of the driven shaft relative to the drive shaft. The vane rotor 130 has a plurality of vanes 131 and a boss 135.

The boss 135 is shaped in a tubular form and is fixed to the end portion 321 of the camshaft 320. Therefore, the vane rotor 130, which has the boss 135, is fixed to the end portion 321 of the camshaft 320 and is rotated integrally with the camshaft 320. A through-hole 136 extends through a center of the boss 135 in the axial direction of the rotational axis AX. The hydraulic oil control valve 10 is installed in the through-hole 136. The retard oil passages 137 and the advance oil passages 138 radially extend through the boss 135. Each of the retard oil passages 137 and an adjacent one of the advance oil passages 138 are arranged one after the other in the axial direction of the rotational axis AX. Each of the retard oil passages 137 communicates between a corresponding one of a plurality of retard ports 27 of the hydraulic oil control valve 10 described later and a corresponding one of a plurality of retard chambers 141 described later. Each of the advance oil passages 138 communicates between a corresponding one of a plurality of advance ports 28 of the hydraulic oil control valve 10 described later and a corresponding one of a plurality of advance chambers 142 described later. The outer sleeve 30 of the hydraulic oil control valve 10 seals between each retard oil passage 137 and each advance oil passage 138 in the through-hole 136.

Each of the vanes 131 radially outwardly projects from the boss 135, which is located at the center of the vane rotor 130, such that the vanes 131 are arranged one after another in the circumferential direction. Each of the vanes 131 is received in a corresponding one of the hydraulic oil chambers 140 and partitions the corresponding hydraulic oil chamber 140 into the retard chamber 141 and the advance chamber 142 in the circumferential direction. The retard chamber 141 is located on one side of the vane 131 in the circumferential direction. The advance chamber 142 is located on the other side of the vane 131 in the circumferential direction.

A receiving hole 132 is formed to extend in the axial direction in one of the vanes 131. The receiving hole 132 is communicated with the corresponding retard chamber 141 through a retard chamber side pin control oil passage 133 formed at the one of the vanes 131 and is communicated with the corresponding advance chamber 142 through an advance chamber side pin control oil passage 134 formed at the one of the vanes 131. The lock pin 150, which is configured to reciprocate in a direction AD and a direction AU, is received in the receiving hole 132. Here, the direction AD is a direction toward the camshaft 320 along the rotational axis AX, and the direction AU is a direction away from the camshaft 320 along the rotational axis AX. The lock pin 150 limits relative rotation of the vane rotor 130 relative to the housing 120 to limit a collision between the housing 120 and the vane rotor 130 in the circumferential direction in a state where the hydraulic oil pressure is insufficient. The lock pin 150 is urged by a spring 151 toward the fitting recess 128 formed at the sprocket 121.

In the present embodiment, the housing 120 and the vane rotor 130 are made of an aluminum alloy. However, the material of the housing 120 and the vane rotor 130 is not limited to the aluminum alloy and may be any other metal material, such as iron, stainless steel, or any resin material.

As shown in FIG. 1, the hydraulic oil control valve 10 is arranged along the rotational axis AX of the valve timing adjustment device 100 and controls a flow of the hydraulic oil supplied from the hydraulic oil supply source 350. An operation of the hydraulic oil control valve 10 is controlled by a command outputted from an undepicted electronic control unit (ECU) that is configured to control an entire operation of the internal combustion engine 300. The hydraulic oil control valve 10 is driven by a solenoid 160 that is located on an opposite side of the hydraulic oil control valve 10 which is opposite to the camshaft 320 in the axial direction of the rotational axis AX. The solenoid 160 includes an electromagnetic device 162 and a shaft 164. The solenoid 160 drives the spool 50 of the hydraulic oil control valve 10 toward the camshaft 320 against a preload of the spring 60 by driving the shaft 164 in the direction AD through energization of the electromagnetic device 162 based on the command of the ECU. As described later, in the hydraulic oil control valve 10, the spool 50 can be slid in the direction AD or the direction AU in response to a balance between the urging force of the solenoid 160 and the preload of the spring 60 to switch between the oil passage communicated with the retard chambers 141 and the oil passage communicated with the advance chambers 142.

Figure 3:
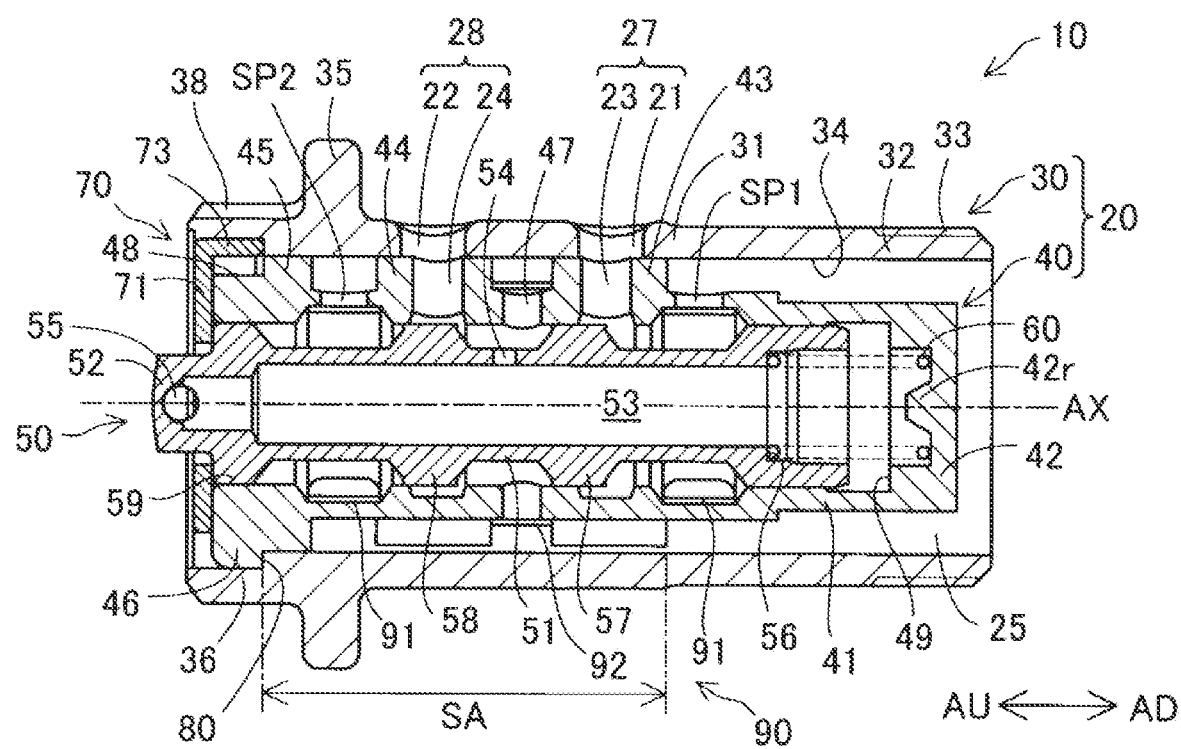
FIG. 3 is a cross-sectional view showing a detailed structure of the hydraulic oil control valve.
Figure 4:
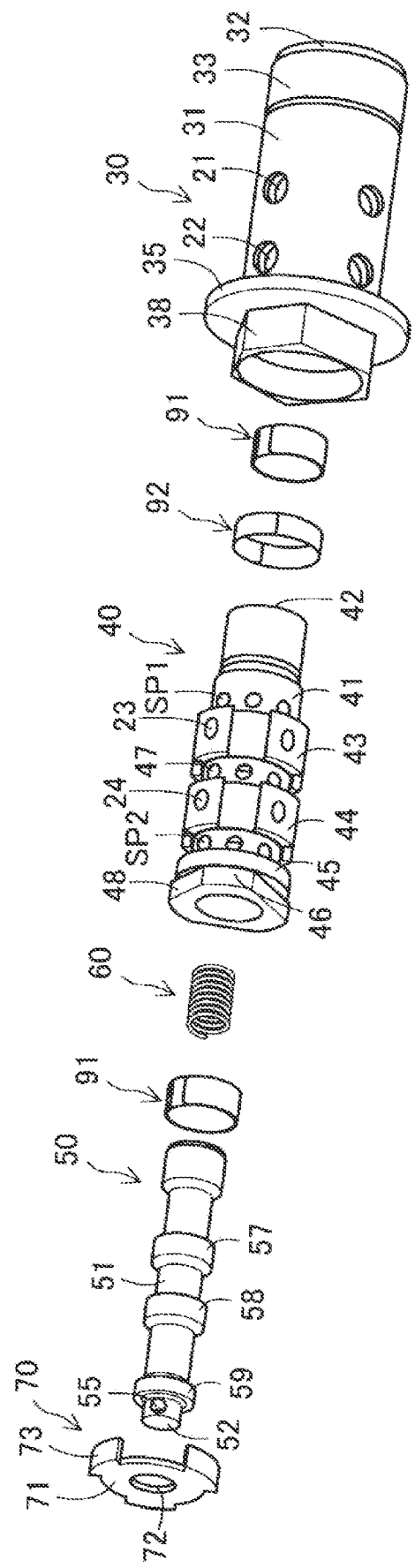
FIG. 4 is an exploded perspective view showing a detailed structure of the hydraulic oil control valve in an exploded state.

As shown in FIGS. 3 and 4, the hydraulic oil control valve 10 includes a sleeve 20, the spool 50, the spring 60, a fixing member 70 and a plurality of check valves 90. FIG. 3 shows a cross-section taken along the rotational axis AX.

The sleeve 20 includes an outer sleeve 30 and an inner sleeve 40. Each of the outer sleeve 30 and the inner sleeve 40 is shaped generally in a tubular form. The sleeve 20 is configured such that the inner sleeve 40 is inserted into an axial hole 34 of the outer sleeve 30.

The outer sleeve 30 forms a contour of the hydraulic oil control valve 10 and is located on a radially outer side of the inner sleeve 40. The outer sleeve 30 includes a main body portion 31, the fixing portion 32, a projection 35, an enlarged diameter portion 36, a movement limiting portion 80 and a tool engaging portion 38. The axial hole 34 is formed to extend along the rotational axis AX in the main body portion 31 and the fixing portion 32. The axial hole 34 extends through the outer sleeve 30 along the rotational axis AX.

The main body portion 31 is shaped in a tubular form and is inserted in the through-hole 136 of the vane 131. A plurality of outer retard ports 21 and a plurality of outer advance ports 22 are formed at the main body portion 31. The outer retard ports 21 are arranged one after another in the circumferential direction and communicate between an outer peripheral surface of the main body portion 31 and the axial hole 34. The outer advance ports 22 are located on the solenoid 160 side of the outer retard ports 21 in the axial direction of the rotational axis AX. The outer advance ports 22 are arranged one after another in the circumferential direction and communicate between the outer peripheral surface of the main body portion 31 and the axial hole 34.

The fixing portion 32 is shaped in a tubular form and is formed continuously with the main body portion 31 in the axial direction of the rotational axis AX. The fixing portion 32 has a diameter that is substantially the same as a diameter of the main body portion 31 and is inserted into the shaft fixing portion 323 of the camshaft 320. The male-threaded portion 33 is formed at the fixing portion 32. The male-threaded portion 33 is threadably engaged with the female-threaded portion 324 that is formed at the shaft fixing portion 323. An axial force is applied to the outer sleeve 30 in the direction AD toward the camshaft 320 by threadably engaging the male-threaded portion 33 and the female-threaded portion 324 together, so that the outer sleeve 30 is fixed to the end portion 321 of the camshaft 320. By the application of the axial force, it is possible to limit a positional deviation between the hydraulic oil control valve 10 and the end portion 321 of the camshaft 320, which would be caused by an eccentric force of the camshaft 320 generated when the intake valves 330 are urged by the camshaft 320. Therefore, leakage of the hydraulic oil can be limited.

The projection 35 radially outwardly projects from the main body portion 31. The projection 35 is in a form of a flange (a circular ring) in this instance but may be in another form of projection in another instance. The vane rotor 130 is clamped between the projection 35 and the end portion 321 of the camshaft 320 along the rotational axis AX. Therefore, the outer sleeve 30, the vane rotor 130 and the camshaft 320 are rotated together in the same phase.

The enlarged diameter portion 36 is formed at an end portion of the main body portion 31 which is located on the solenoid 160 side. An inner diameter of the enlarged diameter portion 36 is larger than an inner diameter of the rest of the main body portion 31. A flange 46 of the inner sleeve 40 described later is placed at the enlarged diameter portion 36.

The movement limiting portion 80 is formed as a stepped portion of the inner peripheral surface of the outer sleeve 30 which is radially stepped by the enlarged diameter portion 36. The flange 46 of the inner sleeve 40 is clamped between the movement limiting portion 80 and the fixing member 70 along the rotational axis AX. Therefore, the movement limiting portion 80 limits the movement of the inner sleeve 40 in the direction AD away from the electromagnetic device 162 of the solenoid 160 along the rotational axis AX.

The tool engaging portion 38 is located on the solenoid 160 side of the projection 35 of the outer sleeve 30, i.e., is located on the side of the projection 35 away from the camshaft 320 in the direction AU. The tool engaging portion 38 is configured to be engaged with a tool (not shown), such as a hexagon socket, and is used to fix the hydraulic oil control valve 10, which includes the outer sleeve 30, to the end portion 321 of the camshaft 320.

The inner sleeve 40 includes a tubular portion 41, a bottom portion 42, a plurality of retard-side projecting walls 43, a plurality of advance-side projecting walls 44, a sealing wall 45, the flange 46 and a stepped portion 49.

The tubular portion 41 is shaped generally in a tubular form and is located on the radially inner side of the outer sleeve 30 such that the tubular portion 41 extends along the main body portion 31 and the fixing portion 32 of the outer sleeve 30. A plurality of retard-side supply ports SP1, a plurality of advance-side supply ports SP2 and a plurality of recycle ports 47 are formed at the tubular portion 41.

The retard-side supply ports SP1 are located on the camshaft 320 side of the retard-side projecting walls 43 in the direction AD and communicate between the outer peripheral surface and the inner peripheral surface of the tubular portion 41. In the present embodiment, the retard-side supply ports SP1 are arranged one after another within a circumferential range, which is one-half of a circumference of the tubular portion 41. Alternatively, the retard-side supply ports SP1 may be arranged one after another along an entire circumference of the tubular portion 41. Further alternatively, there may be formed only one retard-side supply port SP1 at the tubular portion 41. The advance-side supply ports SP2 are located on the solenoid 160 side of the advance-side projecting walls 44 in the direction AU and communicate between the outer peripheral surface and the inner peripheral surface of the tubular portion 41. In the present embodiment, the advance-side supply ports SP2 are circumferentially arranged one after another within a circumferential range, which is one-half of the circumference of the tubular portion 41. Alternatively, the advance-side supply ports SP2 may be circumferentially arranged one after another along the entire circumference of the tubular portion 41. Further alternatively, there may be formed only one advance-side supply port SP2 at the tubular portion 41. The retard-side supply ports SP1 are communicated with the shaft hole 322 of the camshaft 320. Furthermore, the advance-side supply ports SP2 are communicated with the retard-side supply ports SP1 through a plurality of gaps, each of which is formed between corresponding adjacent two of the retard-side projecting walls 43, and a plurality of gaps, each of which is formed between corresponding adjacent two of the advance-side projecting walls 44. Thus, the advance-side supply ports SP2 are communicated with the shaft hole 322 of the camshaft 320.

The recycle ports 47 are formed between the retard-side projecting walls 43 and the advance-side projecting walls 44 and communicate between the outer peripheral surface and the inner peripheral surface of the tubular portion 41. The recycle ports 47 are communicated with the retard-side supply ports SP1 and the advance-side supply ports SP2. Specifically, the recycle ports 47 are communicated with the retard-side supply ports SP1 through the spaces, each of which is radially formed between the inner peripheral surface of the outer sleeve 30 and the outer peripheral surface of the tubular portion 41 of the inner sleeve 40 and is circumferentially formed between the corresponding adjacent two of the retard-side projecting walls 43, and the recycle ports 47 are communicated with the advance-side supply ports SP2 through the spaces, each of which is radially formed between the inner peripheral surface of the outer sleeve 30 and the outer peripheral surface of the tubular portion 41 of the inner sleeve 40 and is circumferentially formed between the corresponding adjacent two of the advance-side projecting walls 44. Therefore, the recycle ports 47 function as a recycle mechanism that returns the hydraulic oil, which is discharged from the retard chambers 141 and the advance chambers 142, to the supply side. In the present embodiment, the recycle ports 47 are arranged one after another in the circumferential direction. Alternatively, there may be formed only one recycle port 47. An operation of the valve timing adjustment device 100 including the operation of switching the oil passage by sliding the spool 50 will be described later.

The bottom portion 42 is formed integrally with the tubular portion 41 in one-piece and closes an end portion of the tubular portion 41 located on the camshaft 320 side in the direction AD. One end portion of the spring 60 contacts the bottom portion 42.

The retard-side projecting walls 43 radially outwardly project from the tubular portion 41 and are arranged one after another in the circumferential direction. The spaces, each of which is formed between the corresponding circumferentially adjacent two of the retard-side projecting walls 43, are communicated with the shaft hole 322 of the camshaft 320 and conduct the hydraulic oil supplied from the hydraulic oil supply source 350. Each of the inner retard ports 23 is formed at the corresponding one of the retard-side projecting walls 43. Each inner retard port 23 communicates between an outer peripheral surface and an inner peripheral surface of the corresponding one of the retard-side projecting walls 43. Each of the inner retard ports 23 is communicated with the corresponding one of the outer retard ports 21 of the outer sleeve 30. A central axis of each of the inner retard ports 23 is deviated from a central axis of the corresponding outer retard port 21 in the axial direction of the rotational axis AX.

The advance-side projecting walls 44 are located on the solenoid 160 side of the retard-side projecting walls 43 in the direction AU. The advance-side projecting walls 44 radially outwardly project from the tubular portion 41 and are arranged one after another in the circumferential direction. The spaces, each of which is formed between the corresponding adjacent two of the advance-side projecting walls 44, are communicated with the shaft hole 322 and conduct the hydraulic oil supplied from the hydraulic oil supply source 350. Each of the inner advance ports 24 is formed at the corresponding one of the advance-side projecting walls 44. Each inner advance port 24 communicates between an outer peripheral surface and an inner peripheral surface of the corresponding one of the advance-side projecting walls 44. Each of the inner advance ports 24 is communicated with the corresponding one of the outer advance ports 22 of the outer sleeve 30. A central axis of the inner advance port 24 is deviated from a central axis of the corresponding outer advance port 22 in the axial direction of the rotational axis AX.

The sealing wall 45 is located on the solenoid 160 side of the advance-side supply ports SP2 in the direction AU and radially outwardly projects from the tubular portion 41 along the entire circumference of the tubular portion 41. The sealing wall 45 seals between the inner peripheral surface of the main body portion 31 of the outer sleeve 30 and the outer peripheral surface of the tubular portion 41 of the inner sleeve 40 to limit leakage of the hydraulic oil, which is conducted in a hydraulic oil supply passage 25 described later, to the solenoid 160 side. An outer diameter of the sealing wall 45 is generally the same as an outer diameter of the retard-side projecting walls 43 and an outer diameter of the advance-side projecting walls 44.

The flange 46 is located at the end portion of the inner sleeve 40 on the solenoid 160 side and radially outwardly projects from the tubular portion 41 along the entire circumference of the tubular portion 41. The flange 46 is held at the enlarged diameter portion 36 of the outer sleeve 30. A plurality of fitting portions 48 are formed at the flange 46. The fitting portions 48 are located at an outer periphery of the flange 46 and are arranged one after another in the circumferential direction. In the present embodiment, each fitting portion 48 is formed by linearly cutting a corresponding portion of the outer periphery of the flange 46. However, instead of forming the fitting portion 48 in the linear form (a planar surface form), the fitting portion 48 may be formed in a curved form (a curved surface form). Each of the fitting portions 48 is engaged with a corresponding one of a plurality of fitting projections 73 of the fixing member 70 described later.

The stepped portion 49 shown in FIG. 3 is formed at the end portion of the inner sleeve 40 on the camshaft 320 side in the direction AD. The stepped portion 49 has an inner diameter smaller than an inner diameter of the other portion of the tubular portion 41, so that the end portion of the spool 50 located on the camshaft 320 side can contact the stepped portion 49. The stepped portion 49 defines a sliding limit of the spool 50 in the direction away from the electromagnetic device 162 of the solenoid 160.

A space, which is formed between an inner peripheral surface of the axial hole 34 of the outer sleeve 30 and an outer peripheral surface of the inner sleeve 40, functions as the hydraulic oil supply passage 25. The hydraulic oil supply passage 25 is communicated with the shaft hole 322 of the camshaft 320 and conducts the hydraulic oil, which is supplied from the hydraulic oil supply source 350, to the retard-side supply ports SP1 and the advance-side supply ports SP2. Each of the outer retard ports 21 and the corresponding one of the inner retard ports 23 form the retard port 27 that is communicated with the corresponding retard chamber 141 through the corresponding retard oil passage 137. Each of the outer advance ports 22 and the corresponding one of the inner advance ports 24 form the advance port 28 that is communicated with the corresponding advance chamber 142 through the corresponding advance oil passage 138.

The outer sleeve 30 and the inner sleeve 40 are sealed relative to each other at least a portion thereof in the axial direction of the rotational axis AX to limit the leakage of the hydraulic oil. More specifically, the retard-side projecting walls 43 seal between: the retard-side supply ports SP1 and the recycle ports 47; and the retard ports 27, and the advance-side projecting walls 44 seal between: the advance-side supply ports SP2 and the recycle ports 47; and the advance ports 28. Furthermore, the sealing wall 45 seals between the hydraulic oil supply passage 25 and the outside of the hydraulic oil control valve 10. Specifically, a range, which is from the retard-side projecting walls 43 to the sealing wall 45 in the axial direction of the rotational axis AX, is set as a sealing range SA. Furthermore, in the present embodiment, an inner diameter of the main body portion 31 of the outer sleeve 30, is generally constant in the sealing range SA.

The spool 50 is located on the radially inner side of the inner sleeve 40. The spool 50 is driven by the solenoid 160, which is in contact with one end of the spool 50, such that the spool 50 is slid in the direction AD or the direction AU and is thereby reciprocated forward or backward in the inside of the inner sleeve 40 in response to the balance between the urging force of the solenoid 160 and the preload of the spring 60.

Figure 5:
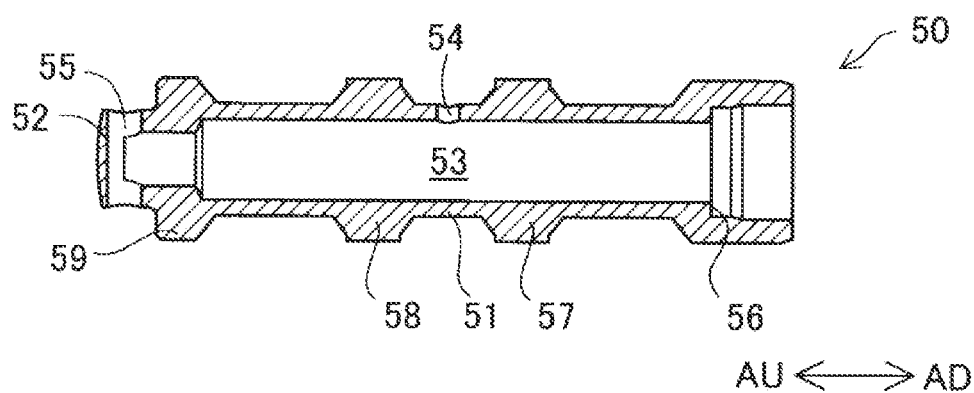
FIG. 5 is a cross-sectional view showing a detailed structure of a spool.

As shown in FIGS. 3 and 5, the spool 50 includes a spool tubular portion 51, a spool bottom portion 52 and a spring receiving portion 56. The spool 50 has at least a portion of a drain oil passage 53, drain inflow ports 54 and drain outflow ports 55. FIG. 5 shows a cross-section of the spool 50 which is circumferentially rotated by 90 degrees relative to a cross-section of the spool 50 shown in FIG. 3.

Figure 6:
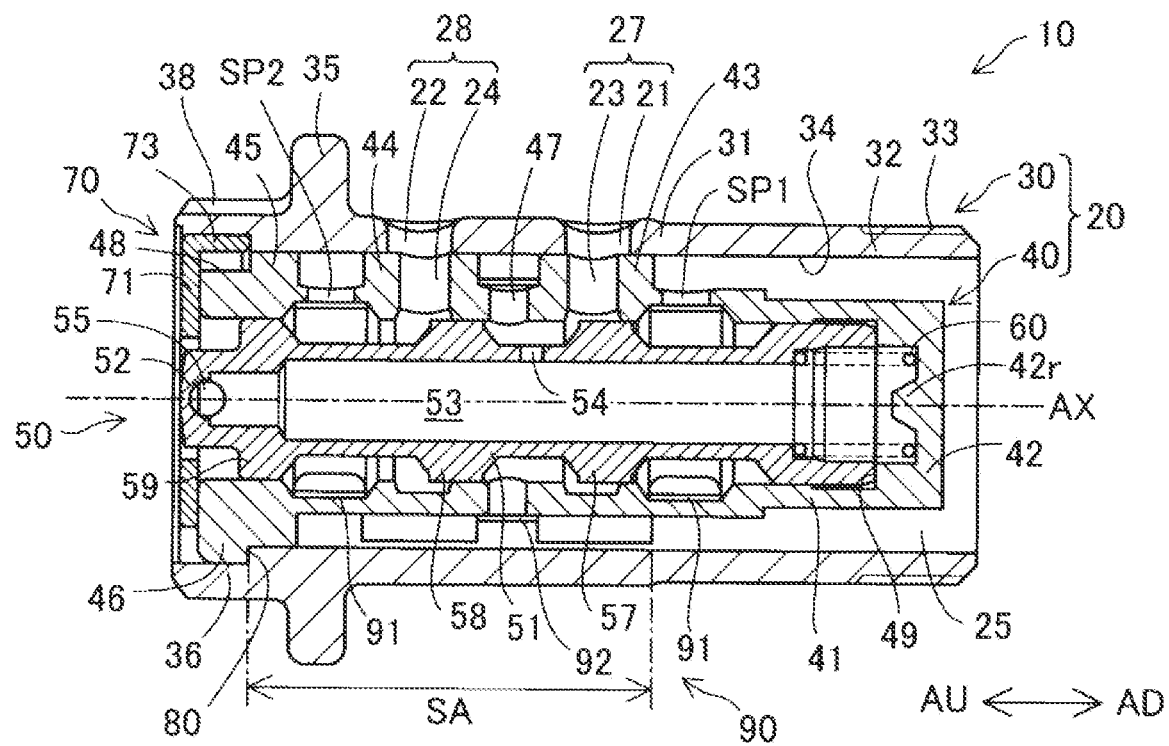
FIG. 6 is a cross-sectional view showing a state in which the spool is in contact with a stepped portion.

As shown in FIGS. 3 to 6, the spool tubular portion 51 is shaped generally in a tubular form. A retard-side seal portion 57, an advance-side seal portion 58 and an engaging portion 59 are arranged in this order from the camshaft 320 side in the axial direction of the rotational axis AX at an outer peripheral surface of the spool tubular portion 51. The retard-side seal portion 57, the advance-side seal portion 58 and the engaging portion 59 radially outwardly project and circumferentially extend all around the spool tubular portion 51. As shown in FIG. 3, in a state where the spool 50 is placed in a closest position, in which the spool 50 is closest to the electromagnetic device 162 of the solenoid 160, the retard-side seal portion 57 disrupts the communication between the recycle ports 47 and the retard ports 27, and the advance-side seal portion 58 disrupts the communication between the advance-side supply ports SP2 and the advance ports 28. As shown in FIG. 6, in the other state where the spool 50 is placed in the furthermost position, in which the spool 50 is furthermost from the electromagnetic device 162, the retard-side seal portion 57 disrupts the communication between the retard-side supply ports SP1 and the retard ports 27, and the advance-side seal portion 58 disrupts the communication between the recycle ports 47 and the advance ports 28. As shown in FIG. 3, the engaging portion 59 defines another sliding limit of the spool 50 in the direction toward the electromagnetic device 162 of the solenoid 160 when the engaging portion 59 contacts the fixing member 70.

The spool bottom portion 52 is formed integrally with the spool tubular portion 51 in one-piece and closes an end portion of the spool tubular portion 51 on the solenoid 160 side. The spool bottom portion 52 can project from the sleeve 20 in the direction AU. The spool bottom portion 52 functions as a proximal end portion of the spool 50.

A space, which is surrounded by the spool tubular portion 51, the spool bottom portion 52 and the tubular portion 41 and the bottom portion 42 of the inner sleeve 40, functions as the drain oil passage 53. Therefore, the inside of the spool 50 functions as at least the portion of the drain oil passage 53. The drain oil passage 53 conducts the hydraulic oil, which is discharged from the retard chambers 141 and the advance chambers 142.

The drain inflow ports 54 are formed in the spool tubular portion 51 at a location that is between the retard-side seal portion 57 and the advance-side seal portion 58 in the axial direction of the rotational axis AX. The drain inflow ports 54 communicate between the outer peripheral surface and the inner peripheral surface of the spool tubular portion 51. The drain inflow ports 54 guide the hydraulic oil, which is discharged from the retard chambers 141 and the advance chambers 142, to the drain oil passage 53. Furthermore, the drain inflow ports 54 are communicated with each supply port SP1, SP2 through the recycle ports 47.

The drain outflow ports 55 open toward the radially outside at the spool bottom portion 52 that is the one end portion of the spool 50. The drain outflow ports 55 discharge the hydraulic oil of the drain oil passage 53 to the outside of the hydraulic oil control valve 10. The hydraulic oil, which is discharged from the drain outflow ports 55, is recovered in the oil pan 352.

The spring receiving portion 56 is formed at the end portion of the spool tubular portion 51 on the camshaft 320 side such that an inner diameter of the spring receiving portion 56 is increased in comparison to an inner diameter of the other portion of the spool tubular portion 51. The other end portion of the spring 60 contacts the spring receiving portion 56.

In the present embodiment, the outer sleeve 30 and the spool 50 are made of iron, and the inner sleeve 40 is made of aluminum. The materials of these members are not limited to these materials, and each of these members may be made of any other metal material or any resin material.

The spring 60 is a compression coil spring, and the two end portions of the spring 60 contact the bottom portion 42 of the inner sleeve 40 and the spring receiving portion 56 of the spool 50, respectively. The spring 60 applies the preload to the spool 50 in the direction AU.

The fixing member 70 is fixed to the end portion of the outer sleeve 30 on the solenoid 160 side. The fixing member 70 includes a planar plate portion 71 and the fitting projections 73.

The planar plate portion 71 is shaped in a planar plate form that extends in the radial direction. The extending direction of the planar plate portion 71 is not limited to the radial direction and may be any intersecting direction that intersects the rotational axis AX. An opening 72 is formed generally at the center of the planar plate portion 71. The spool bottom portion 52, which is the one end portion of the spool 50, is inserted into the opening 72.

The fitting projections 73 project from the planar plate portion 71 in the direction AD and are arranged one after another in the circumferential direction. The projecting direction of the fitting projections 73 is not limited to the direction AD. For instance, the fitting projections 73 may project from the planar plate portion 71 in any intersecting direction that intersects the radial direction. Each of the fitting projections 73 is engaged with the corresponding one of the fitting portions 48 of the inner sleeve 40.

The fixing member 70 is assembled such that the fitting projections 73 are engaged with the fitting portions 48 after inserting the spool 50 into the inside of the inner sleeve 40, and thereafter the fixing member 70 is fixed to the outer sleeve 30 by plastically deforming the fixing member 70 against the outer sleeve 30. An outer periphery of an end surface of the fixing member 70 on the solenoid 160 side functions as a deforming portion that is plastically deformed against the outer sleeve 30. Therefore, the outer sleeve 30 and the inner sleeve 40 are fixed. At this time, the inner sleeve 40 is assembled to the outer sleeve 30 by setting an angle around the rotational axis AX. This point will be described later.

By fixing the fixing member 70 to the outer sleeve 30 in the state where the fitting projections 73 are engaged with the fitting portions 48, the rotation of the inner sleeve 40 relative to the outer sleeve 30 in the circumferential direction is limited. Furthermore, removal of the inner sleeve 40 and the spool 50 from the outer sleeve 30 in the direction AU is limited when the fixing member 70 is fixed to the outer sleeve 30.

Each of the check valves 90 is configured to limit a backflow of the hydraulic oil. The check valves 90 include two supply check valves 91 and a recycle check valve 92. The supply check valves 91 and the recycle check valve 92 are respectively formed by winding a strip-shaped thin plate in a ring form, so that the supply check valves 91 and the recycle check valve 92 are resiliently deformed in the radial direction. One of the supply check valves 91 is placed at a position, which corresponds to the retard-side supply ports SP1, and the other one of the supply check valves 91 is placed at another position, which corresponds to the advance-side supply ports SP2, such that the supply check valves 91 contact the inner peripheral surface of the tubular portion 41. When the pressure of the hydraulic oil is applied to each supply check valve 91 from the radially outer side, a size of an overlapped portion of the strip-shaped thin plate of the supply check valve 91, at which two circumferential end portions of the strip-shaped thin plate are overlapped with each other, is increased, and thereby the wound strip-shaped thin plate is diametrically shrunk. The recycle check valve 92 is placed at a position, which corresponds to the recycle ports 47, such that the recycle check valve 92 contacts the outer peripheral surface of the tubular portion 41. When the pressure of the hydraulic oil is applied to the recycle check valve 92 from the radially inner side, a size of an overlapped portion of the strip-shaped thin plate of the recycle check valve 92, at which two circumferential end portions of the strip-shaped thin plate are overlapped with each other, is decreased, and thereby the wound strip-shaped thin plate is diametrically expanded.

In the present embodiment, the crankshaft 310 corresponds to a subordinate concept of a drive shaft of the present disclosure, and the camshaft 320 corresponds to a subordinate concept of a driven shaft of the present disclosure. Furthermore, the intake valves 330 correspond to a subordinate concept of valves of the present disclosure. The solenoid 160 corresponds to a subordinate concept of an actuator of the present disclosure.

(A-2. Operation of Valve Timing Adjustment Device)

As shown in FIG. 1, the hydraulic oil, which is supplied from the hydraulic oil supply source 350 to the supply hole 326, is conducted to the hydraulic oil supply passage 25 through the shaft hole 322. Like in the state shown in FIG. 3, in the state where the solenoid 160 is not energized, and thereby the spool 50 is placed in the closest position that is closest to the electromagnetic device 162 of the solenoid 160, the retard ports 27 are communicated with the retard-side supply ports SP1. Therefore, the hydraulic oil of the hydraulic oil supply passage 25 is supplied to the retard chambers 141, so that the vane rotor 130 is rotated relative to the housing 120 in the retarding direction, and thereby the relative rotational phase of the camshaft 320 relative the crankshaft 310 is changed toward the retard side. Furthermore, in this state, the advance ports 28 are not communicated with the advance-side supply ports SP2 but are communicated with the recycle ports 47. Therefore, the hydraulic oil, which is discharged from the advance chambers 142, is returned to the retard-side supply ports SP1 through the recycle ports 47 and is recirculated. Furthermore, a portion of the hydraulic oil, which is discharged from the advance chambers 142, flows into the drain oil passage 53 through the drain inflow ports 54 and is returned to the oil pan 352 through the drain outflow ports 55.

As shown in FIG. 6, in the other state where the solenoid 160 is energized, and thereby the spool 50 is placed in the furthermost position, in which the spool 50 is furthermost from the electromagnetic device 162 of the solenoid 160, i.e., the spool 50 is closest to the stepped portion 49, the advance ports 28 are communicated with the advance-side supply ports SP2. Therefore, the hydraulic oil of the hydraulic oil supply passage 25 is supplied to the advance chambers 142, so that the vane rotor 130 is rotated relative to the housing 120 in the advancing direction, and thereby the relative rotational phase of the camshaft 320 relative the crankshaft 310 is changed toward the advance side. Furthermore, in this state, the retard ports 27 are not communicated with the retard-side supply ports SP1 but are communicated with the recycle ports 47. Therefore, the hydraulic oil, which is discharged from the retard chambers 141, is returned to the advance-side supply ports SP2 through the recycle ports 47 and is recirculated. Furthermore, a portion of the hydraulic oil, which is discharged from the retard chambers 141, flows into the drain oil passage 53 through the drain inflow ports 54 and is returned to the oil pan 352 through the drain outflow ports 55.

Figure 7:
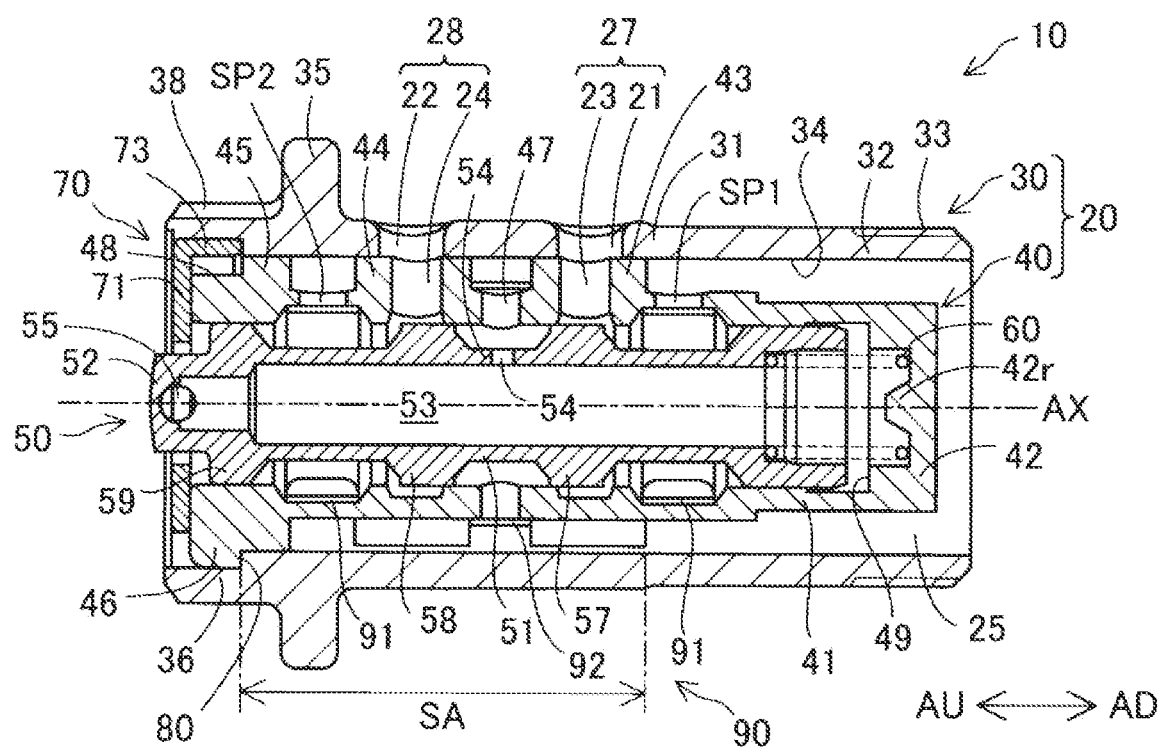
FIG. 7 is a cross-sectional view showing a state in which the spool is located substantially in the center of a sliding range.

Furthermore, as shown in FIG. 7, in a state where the spool 50 is placed generally at the center of the sliding range of the spool 50 in response to the energization of the solenoid 160, the retard ports 27 are communicated with the retard-side supply ports SP1, and the advance ports 28 are communicated with the advance-side supply ports SP2. Thus, the hydraulic oil of the hydraulic oil supply passage 25 is supplied to both the retard chambers 141 and the advance chambers 142, so that the relative rotation of the vane rotor 130 relative to the housing 120 is limited, and thereby the current relative rotational phase of the camshaft 320 relative to the crankshaft 310 is maintained.

The hydraulic oil, which is supplied to the retard chambers 141 or the advance chambers 142, flows into the receiving hole 132 through the retard chamber side pin control oil passage 133 or the advance chamber side pin control oil passage 134. Therefore, when the lock pin 150 is removed from the fitting recess 128 against the urging force of the spring 151 by the hydraulic oil supplied to the receiving hole 132 in response to the application of the sufficient hydraulic oil pressure to the retard chambers 141 or the advance chambers 142, the relative rotation of the vane rotor 130 relative to the housing 120 is enabled.

In a case where the relative rotational phase of the camshaft 320 is on the advance side of a target value, the amount of electric power supply to the solenoid 160 is made relatively small at the valve timing adjustment device 100, so that the vane rotor 130 is rotated relative to the housing 120 in the retarding direction. Therefore, the relative rotational phase of the camshaft 320 relative to the crankshaft 310 is changed toward the retard side, and thereby the valve timing is retarded. In another case where the relative rotational phase of the camshaft 320 is on the retard side of the target value, the amount of electric power supply to the solenoid 160 is made relatively large at the valve timing adjustment device 100, so that the vane rotor 130 is rotated relative to the housing 120 in the advancing direction. Therefore, the relative rotational phase of the camshaft 320 relative to the crankshaft 310 is changed toward the advance side, and thereby the valve timing is advanced. In a further case where the relative rotational phase of the camshaft 320 coincides with the target value, the amount of electric power supply to the solenoid 160 is made intermediate at the valve timing adjustment device 100, so that the relative rotation of the vane rotor 130 relative to the housing 120 is limited. Therefore, the current relative rotational phase of the camshaft 320 relative to the crankshaft 310 is maintained, and thereby the current valve timing is maintained.

(A-3. With Respect to Inner Sleeve and Spring)

At the time of inserting the spring 60 into the inner sleeve 40, the inner sleeve 40 is arranged such that the bottom portion 42 of the inner sleeve 40 is placed downward in the direction of gravity, and an opening of the inner sleeve 40 is placed upward in the direction of gravity. Then, the spring 60 is inserted from the opening of the inner sleeve 40 and let the spring 60 fall naturally.

Figure 8:
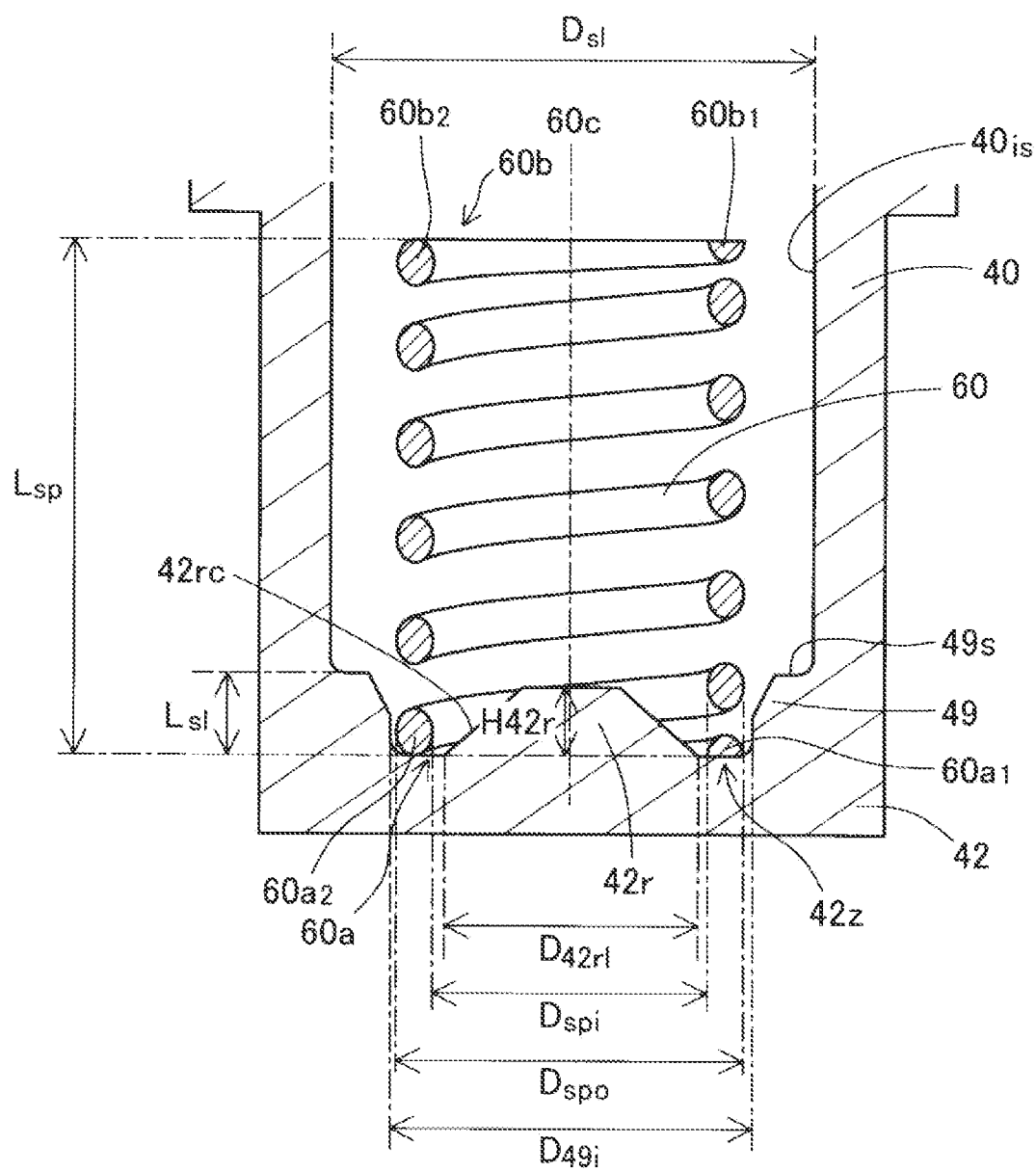
FIG. 8 is an explanatory diagram showing an example where a spring is inserted into an inner sleeve without tilting.

FIG. 8 shows an example where the spring 60 is inserted into the inner sleeve 40 without tilting the spring 60, i.e., a state where the spring 60 is correctly inserted into the inner sleeve 40. The inner sleeve 40 is shaped in a cylindrical tubular form and has the opening at one end portion of the inner sleeve 40. A protrusion 42r is formed at a center of the bottom portion 42 such that the protrusion 42r protrudes toward the opening (the upper side in FIG. 8) of the inner sleeve 40. In the first embodiment, the protrusion 42r is shaped in a conical frustum that is tapered toward a distal end thereof. The protrusion 42r has a sloped peripheral surface (also referred to as a slope surface) 42rc that is tapered toward the opening of the inner sleeve 40. Specifically, a maximum diameter of the protrusion 42r is smaller than an inner diameter of a first end portion 60a of the spring 60, and the protrusion 42r has the sloped peripheral surface 42rc that has an outer diameter which is progressively reduced from one side of the sloped peripheral surface 42rc, at which a spring seat 42z is placed, toward the opening of the inner sleeve 40. A height H42r of the protrusion 42r is lower than a height Lsl of the stepped portion 49 described later. The outer diameter D42r1 of the protrusion 42r at the spring seat 42z side is the maximum diameter of the protrusion 42r and is smaller than the inner diameter Dspi of the first end portion 60a of the spring 60. The first end portion 60a of the spring 60 is in contact with and is seated against the spring seat 42z which is formed on the radially outer side of the protrusion 42r. An outer diameter D49i of the spring seat 42z is larger than an outer diameter Dspo of the first end portion 60a of the spring 60. Specifically, the outer diameter Dspo and the inner diameter Dspi of the spring 60 are set to enable the spring 60 to seat against the spring seat 42z.

The inner sleeve 40 has the stepped portion 49 which surrounds the spring seat 42z on the radially outer side of the spring seat 42z. The stepped portion 49 limits movement of the spool 50 toward the spring seat 42z. The stepped portion 49 has a spool contact surface 49s that is configured to contact the spool 50. The inner diameter of the inner sleeve 40 is denoted by Dsl. A height of the stepped portion 49, which is measured from the spring seat 42z to the spool contact surface 49s configured to contact the spool 50, is denoted by Lsl.

A free length of the spring 60, i.e., a length of the spring 60, which is measured from the first end portion 60a to a second end portion 60b of the spring 60 in a state where a force is not applied to the spring 60, is denoted by Lsp. The second end portion 60b (both one end part 60b1 and another end part 60b2 of the second end portion 60b described later) of the spring 60 does not contact an inner peripheral surface 40 is of the inner sleeve 40.

Figure 9:
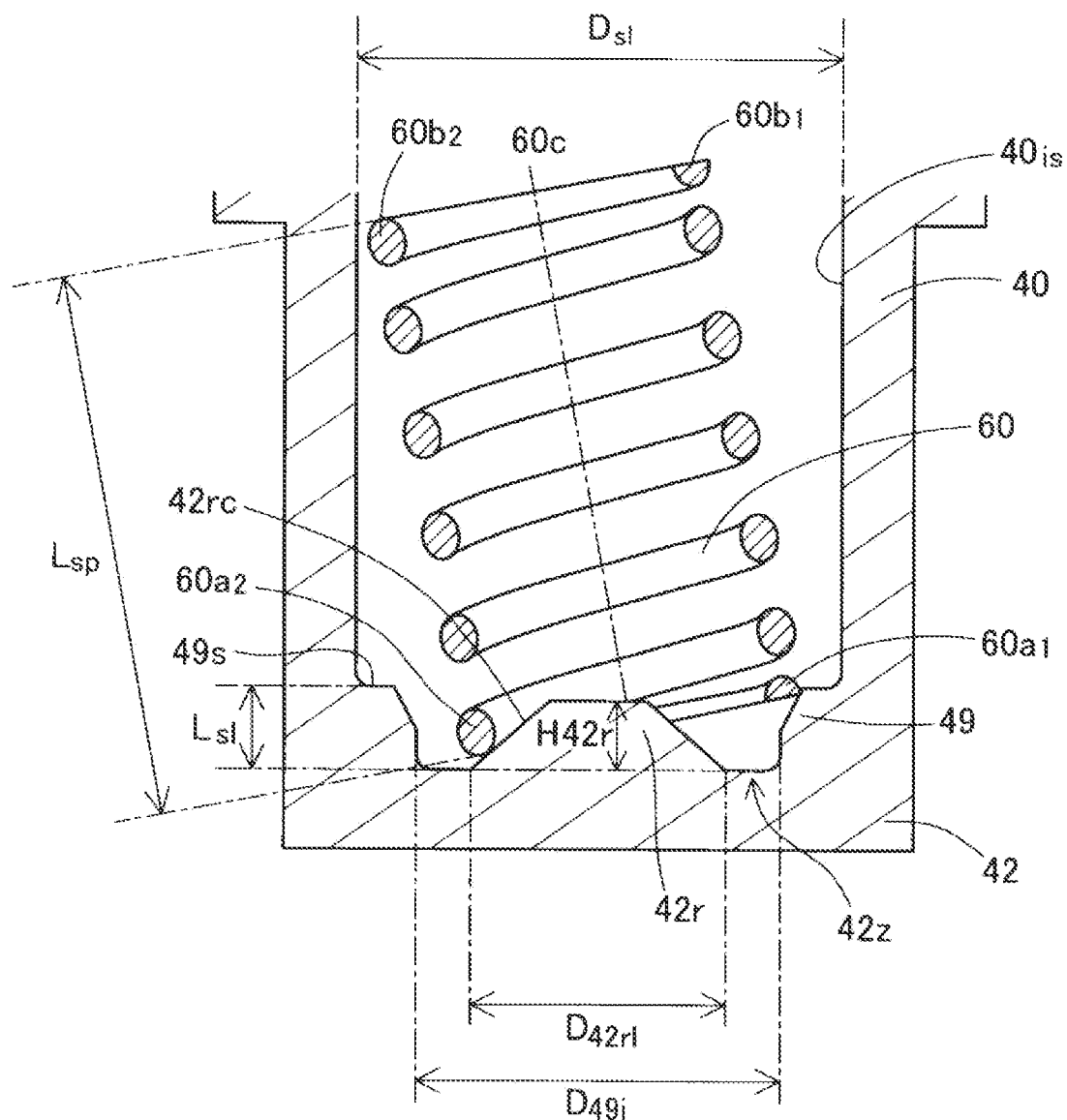
FIG. 9 is an explanatory diagram showing a state where the spring is inserted into the inner sleeve in a state where the spring is tilted.

FIG. 9 indicates a state where the spring 60 is inserted into the inner sleeve 40 in a state where the spring 60 is tilted. In the example shown in FIG. 9, the first end portion 60a of the spring 60 is not seated against the spring seat 42z, and one end part 60a1 of the first end portion 60a contacts the spool contact surface 49s of the stepped portion 49, and another end part 60a2 of the first end portion 60a contacts the peripheral surface of the conical frustum of the protrusion 42r. Here, the end part 60a2 of the first end portion 60a placed in contact with the sloped peripheral surface 42rc is positioned closer to the spring seat 42z than the end part 60a1 of the first end portion 60a. In the first embodiment, the protrusion 42r is configured such that in a state where the first end portion 60a is not seated against the spring seat 42z while the spring 60 is placed adjacent to the spring seat 42z of the inner sleeve 40, the end part 60a2 of the first end portion 60a contacts the protrusion 42r. In such a case, the first end portion 60a of the spring 60 can be seated against the spring seat 42z by dropping the end part 60a2 of the first end portion 60a along the sloped peripheral surface 42rc of the protrusion 42r toward the lower side, i.e., toward the spring seat 42z, and thereby dropping the end part 60a1 of the first end portion 60a from the stepped portion 49.

As described above, according to the first embodiment, the protrusion 42r is configured such that in the state where the first end portion 60a is not seated against the spring seat 42z of the inner sleeve 40 while the spring 60 is placed adjacent to the spring seat 42z, the end part 60a2 of the first end portion 60a is placed in contact with the protrusion 42r. Therefore, the end part 60a2 of the first end portion 60a can be dropped along the sloped peripheral surface 42rc to drop the end part 60a1 of the first end portion 60a from the stepped portion 49, and thereby the spring 60 can be placed in the state shown in FIG. 8 where the first end portion 60a of the spring 60 is correctly placed at the spring seat 42z.

The protrusion 42r may be configured such that in a state where the end part 60a1 of the first end portion 60a of the spring 60 contacts the stepped portion 49 before the end part 60b2 of the second end portion 60b contacts the inner peripheral surface 40 is of the inner sleeve 40, the end part 60a2 of the first end portion 60a contacts the protrusion 42r. In such a case, the end part 60a2 of the first end portion 60a of the spring 60 can be dropped along the sloped peripheral surface 42rc of the protrusion 42r to drop the end part 60a1 of the first end portion 60a from the stepped portion 49, and thereby the spring 60 can be placed in the state shown in FIG. 8 where the first end portion 60a of the spring 60 is correctly placed at the spring seat 42z. Here, the end part 60a2 of the first end portion 60a of the spring 60 is an end part of the first end portion 60a which is other than the contact part (i.e., the end part 60a1) of the first end portion 60a that comes in contact with the stepped portion 49.

Hereinafter, a shape and dimensions of the protrusion 42r of the inner sleeve 40 will be described with reference to FIG. 10. A spring tilt angle is denoted by $\alpha$. The spring tilt angle is a tilt angle of a central axis 60c of the spring 60 relative to a line (plumb line) extending in the direction of gravity. This spring tilt angle is equal to an angle that is defined between a straight line, which connects between the end part 60a1 and the end part 60a2 of the first end portion 60a of the spring 60, and the spring seat 42z (more specifically, a plane of the spring seat 42z). Furthermore, a point, at which a straight line extending toward the bottom portion 42 along the outer diameter of the spring 60 in the longitudinal direction of the spring 60 impinges the stepped portion 49, is defined as a point S1. Also, another point, at which a straight line extending toward the bottom portion 42 along the outer diameter of the spring 60 in the longitudinal direction of the spring 60 impinges the protrusion 42r, is defined as a point S2. Furthermore, a straight line, which extends toward the bottom portion 42 from the end part 60b2 of the second end portion 60b that is a closest part of the second end portion 60b being closest to the inner peripheral surface 40 is of the inner sleeve 40, impinges the stepped portion 49 at a point S3. A distance between the point S1 and the point S2 in the direction of gravity is expressed by Dspo·sin($\alpha$). Furthermore, a distance between the point S1 and the point S2 in the horizontal direction is expressed by Dspo·cos($\alpha$). A distance between the point S2 and the point S3 in the horizontal direction is expressed by Lsp·sin($\alpha$). In the present embodiment, the height Lsl of the stepped portion 49 is larger than the distance Dspo·sin($\alpha$) between the point S1 and the point S2. Furthermore, the inner diameter Dsl of the inner sleeve 40 is larger than a sum of the horizontal distance between the point S1 and the point S2 and the horizontal distance between the point S2 and the point S3. Specifically, the protrusion 42r is configured to satisfy the following two equations:

$Lsl > Dspo \cdot \sin(\alpha)$; and $Dsl > Dspo \cdot \cos(\alpha) + Lsp \cdot \sin(\alpha)$.

In the case where the shape and the dimensions of the protrusion 42r and the stepped portion 49 of the inner sleeve 40 satisfy the above equations in relation to the inner diameter of the inner sleeve 40 and the shape and the dimensions of the spring 60, the end part 60a2 of the first end portion 60a can be dropped along the sloped peripheral surface 42rc of the protrusion 42r to drop the end part 60a1 of the first end portion 60a of the spring 60 from the stepped portion 49, and thereby the spring 60 can be placed in the state shown in FIG. 8 where the first end portion 60a is correctly placed at the spring seat 42z.

Figure 11:
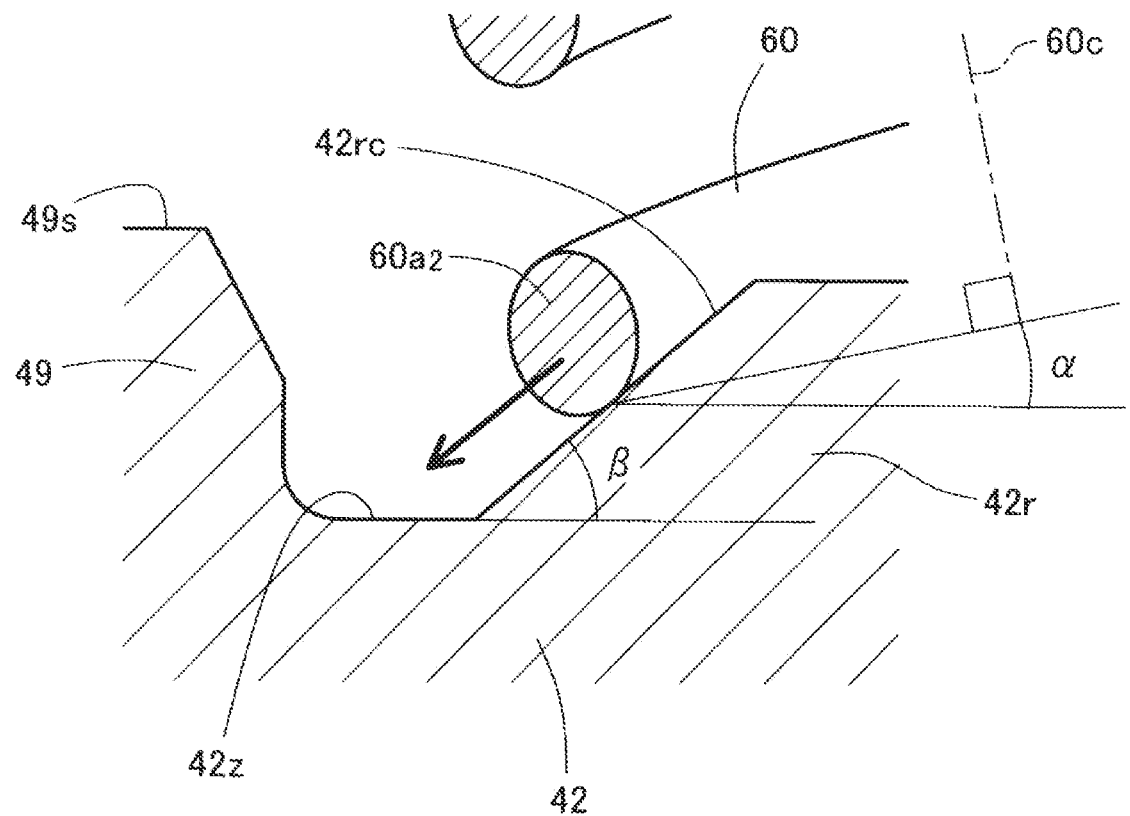
FIG. 11 is an explanatory diagram showing a relationship between an angle of a sloped peripheral surface of the protrusion relative to a spring seat and a spring tilt angle that is a tilt angle of the spring.

As shown in FIG. 11, an angle $\beta$ of the sloped peripheral surface 42rc relative to the spring seat 42z may be set to be larger than the spring tilt angle $\alpha$ which is the tilt angle of the spring 60. When the angle $\beta$ of the sloped peripheral surface 42rc relative to the spring seat 42z is larger than the spring tilt angle α, the end part 60a2 of the first end portion 60a can be more easily dropped to the spring seat 42z along the sloped peripheral surface 42rc of the protrusion 42r.

B. Second Embodiment

In the first embodiment, the height H42r of the protrusion 42r, which is measured from the spring seat 42z to the top of the protrusion 42r, is less than the height Lsl of the spool contact surface 49s of the stepped portion 49, which is measured from the spring seat 42z to the spool contact surface 49s. In contrast, in the second embodiment shown in FIG. 12, the height H42r of the protrusion 42r, which is measured from the spring seat 42z to the top of the protrusion 42r, is equal to or higher than the height Lsl of the spool contact surface 49s of the stepped portion 49, which is measured from the spring seat 42z. In this case, when the spring 60 is dropped into the inside of the inner sleeve 40, there will be two possible cases. Specifically, in one case, the position of the end part 60a2 of the first end portion 60a of the spring 60 placed in contact with the protrusion 42r is lower than the position of the end part 60a1 of the first end portion 60a placed in contact with the spool contact surface 49s. In the other case, the position of the end part 60a2 of the first end portion 60a placed in contact with the protrusion 42r is higher than the position of the end part 60a1 of the first end portion 60a placed in contact with the spool contact surface 49s.

Figure 10:
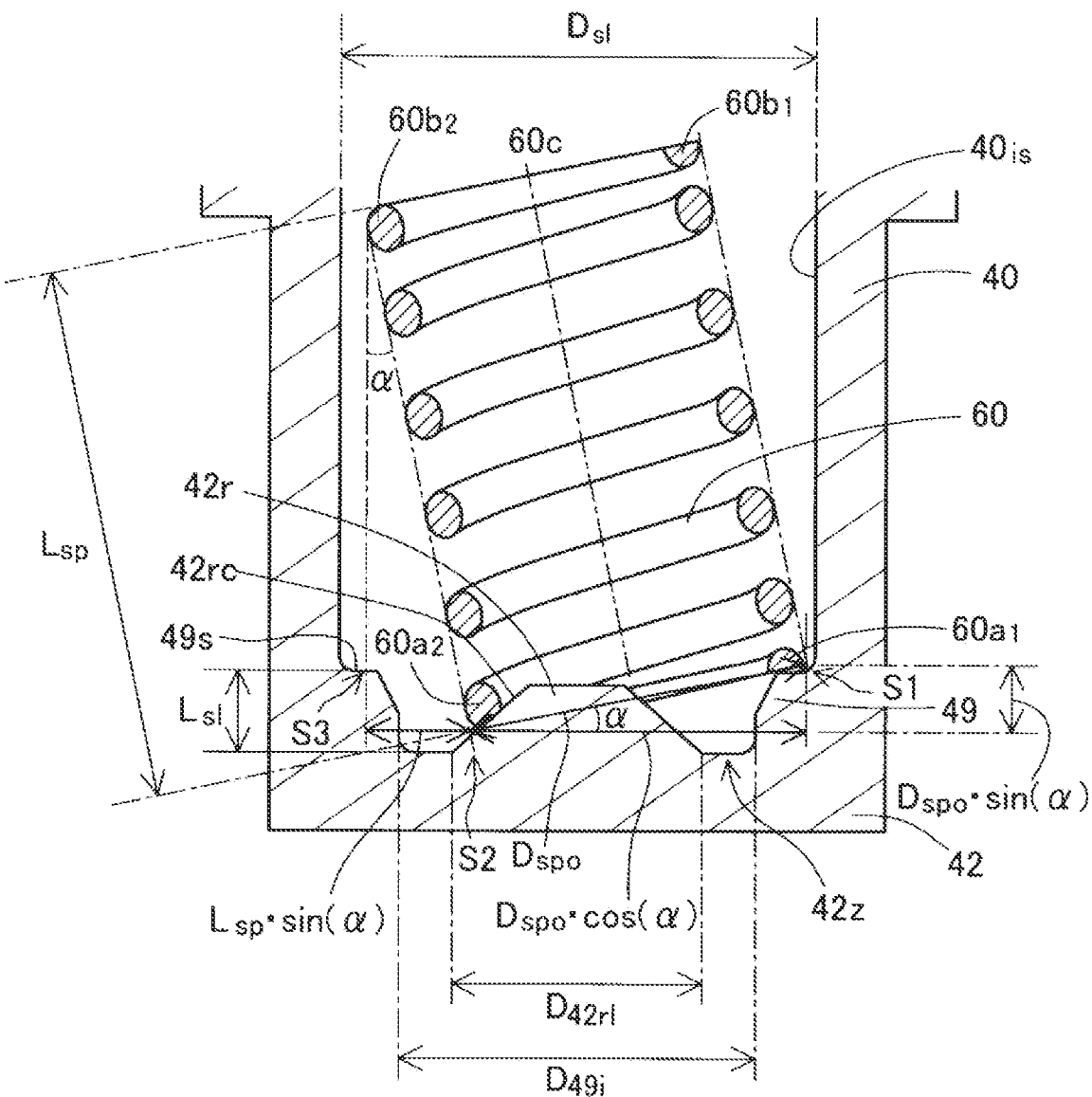
FIG. 10 is an explanatory diagram illustrating a shape and dimensions of a protrusion of the inner sleeve.

In the case where the position of the end part 60a2 of the first end portion 60a placed in contact with the protrusion 42r is lower than the position of the end part 60a1 of the first end portion 60a placed in contact with the spool contact surface 49s, the end part 60a2 of the first end portion 60a can be dropped along the sloped peripheral surface 42rc of the protrusion 42r to drop the end part 60a1 of the first end portion 60a from the stepped portion 49 like in the first embodiment discussed with reference to FIGS. 9 and 10, and thereby the spring 60 can be placed in the state shown in FIG. 8 where the first end portion 60a is correctly placed at the spring seat 42z.

Figure 12:
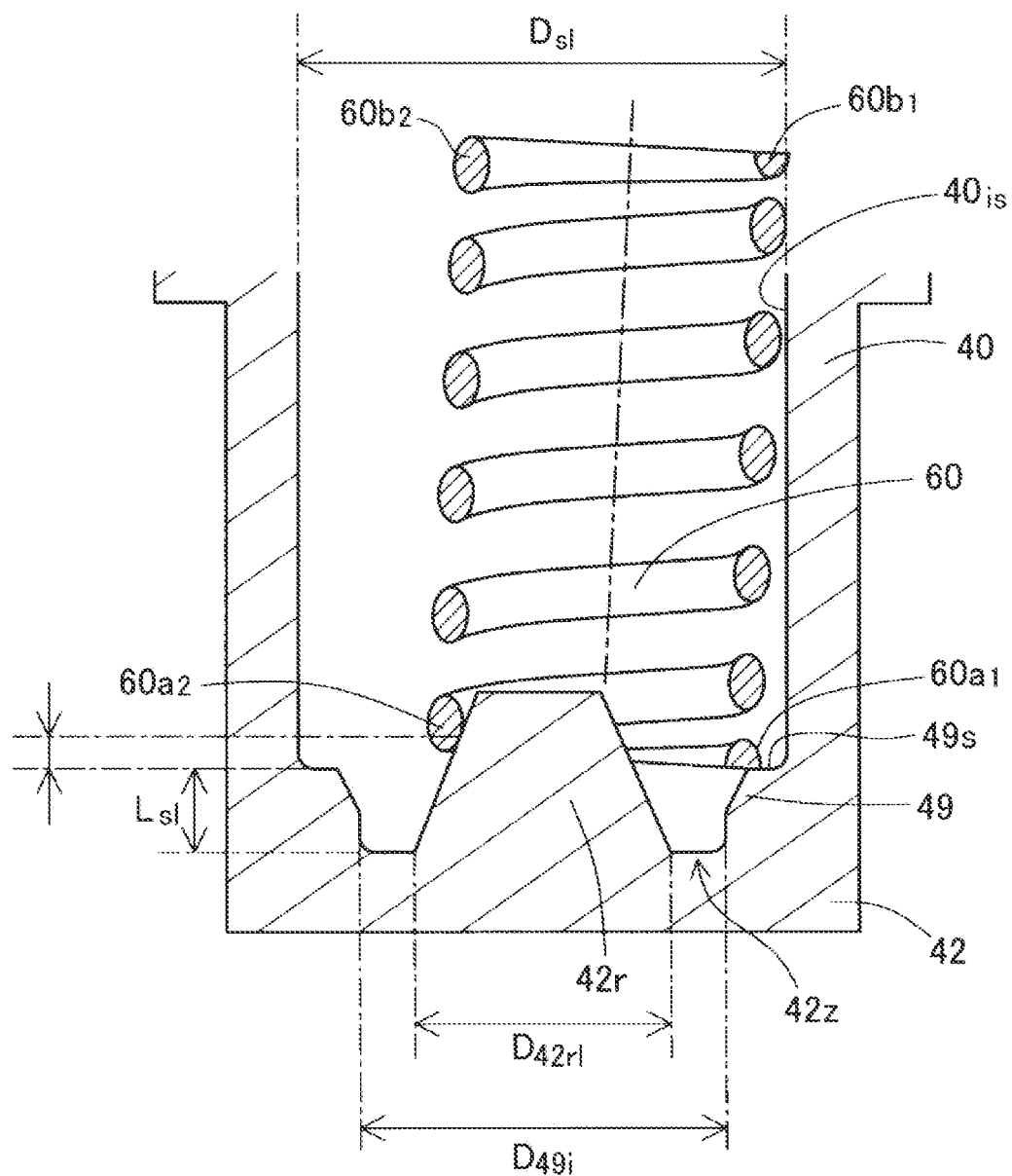
FIG. 12 is an explanatory diagram showing a protrusion of a second embodiment.

Furthermore, in the other case where the position of the end part 60a2 of the first end portion 60a placed in contact with the protrusion 42r is higher than the position of the end part 60a1 of the first end portion 60a placed in contact with the spool contact surface 49s, the end part 60a1 of the first end portion 60a is spaced from the inner peripheral surface 40is of the inner sleeve 40, as shown in FIG. 12. Specifically, the end part 60a1 of the first end portion 60a of the spring 60 is placed in the position where the end part 60a1 of the first end portion 60a can be easily dropped from the spool contact surface 49s. In this state, when the end part 60a1 of the first end portion 60a is dropped from the spool contact surface 49s, the end part 60a2 of the first end portion 60a is also dropped along the sloped peripheral surface 42rc of the protrusion 42r, and thereby the first end portion 60a of the spring 60 is correctly placed at the spring seat 42z.

Therefore, the spring 60 can be correctly placed at the spring seat 42z in each of: the one case where the position of the end part 60a2 of the first end portion 60a of the spring 60 placed in contact with the protrusion 42r is lower than the position of the end part 60a1 of the first end portion 60a placed in contacts the spool contact surface 49s; and the other case where the position of the end part 60a2 of the first end portion 60a placed in contact with the protrusion 42r is higher than the position of the end part 60a1 of the first end portion 60a placed in contact with the spool contact surface 49s.

(C. Shape of Protrusion 42r)

Figure 13:
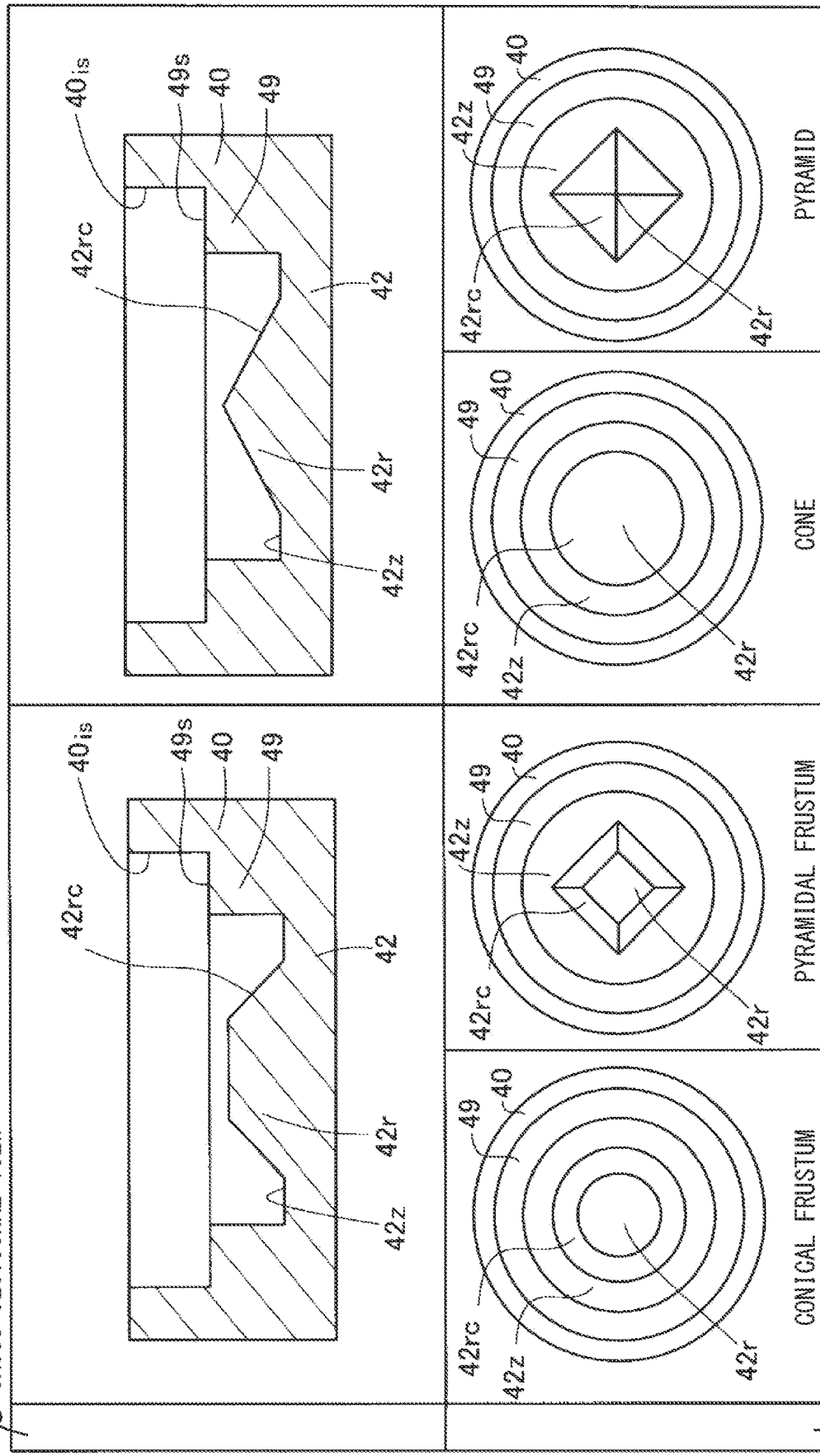
FIG. 13 is an explanatory diagram showing other examples of the protrusion.

As shown in FIG. 13, the protrusion 42r may have a shape of any one of a conical frustum, a pyramidal frustum, a cone and a pyramid.

Figure 14:
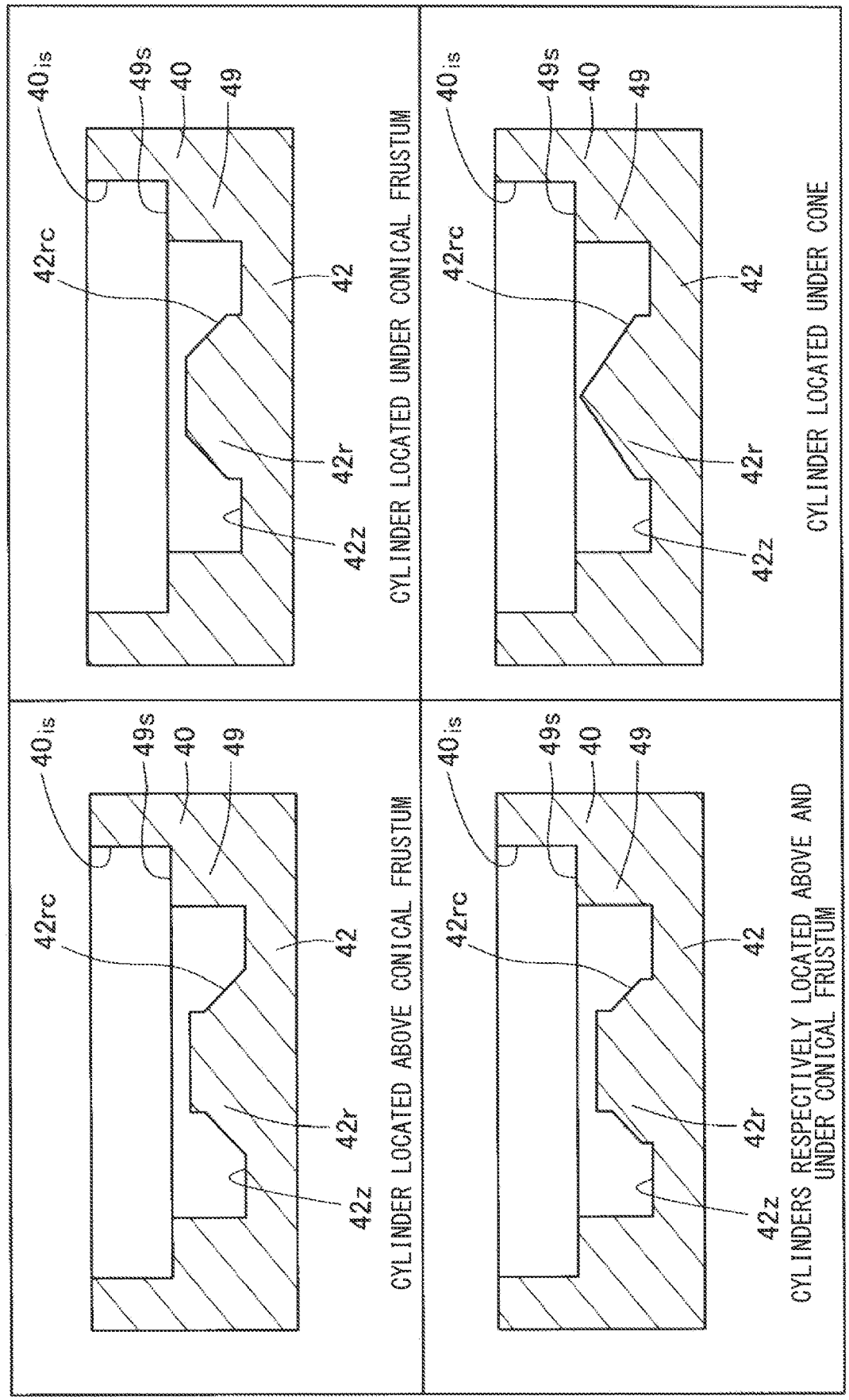
FIG. 14 is an explanatory diagram showing other examples of the protrusion.

As shown in FIG. 14, the protrusion 42r may have a shape in which a cylinder is provided on at least one of an upper side and a lower side of the conical frustum. Furthermore, the protrusion 42r may have a shape in which a cylinder is provided on a lower side of the cone. That is, the protrusion 42r may have a perpendicular surface, which is perpendicular to the spring seat 42z and is formed to at least one of the top side and the spring seat 42z side of the protrusion 42r. A shape of a bottom surface of the cylinder may be the same as a shape of a top surface of the conical frustum in a case where the cylinder is placed on the top side of the conical frustum. Alternatively, the shape of the bottom surface of the cylinder may be the same as a shape of a bottom surface of the conical frustum or the cone in a case where the cylinder is placed on the lower side of the conical frustum or the lower side of the cone. In view of FIG. 14, there is described the example where the protrusion 42r has the shape having the cylinder on at least one of the upper side and the lower side of the conical frustum or the shape having the cylinder on the lower side of the cone. Alternatively, the protrusion 42r may have a shape having a prism on at least one of the upper side and the lower side of the pyramidal frustum, or a shape having the prism on the lower side of the pyramid.

Figure 15:
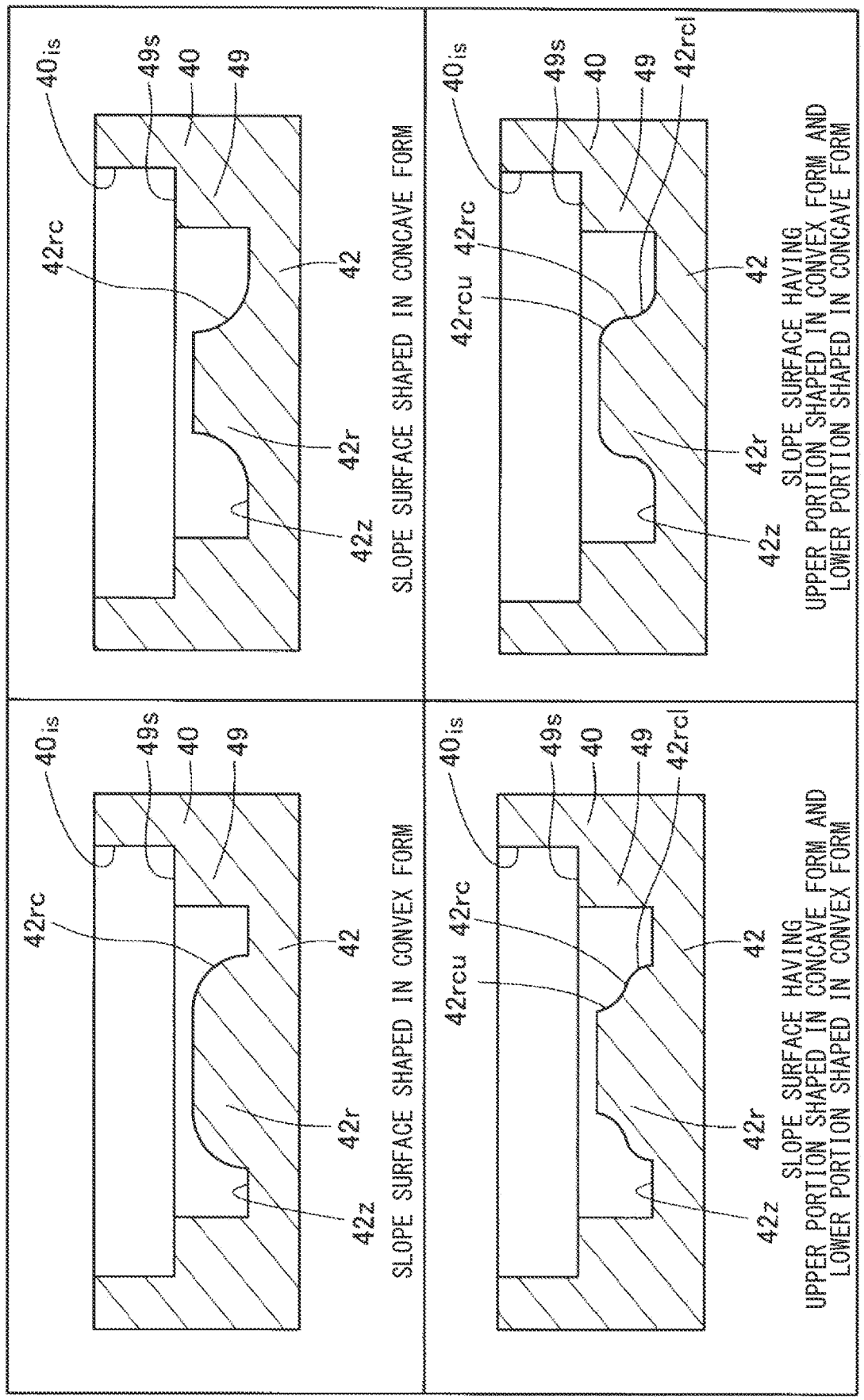
FIG. 15 is an explanatory diagram showing other examples of the protrusion.

As shown in FIG. 15, with respect to the shape of the sloped peripheral surface 42rc of the conical frustum, the protrusion 42r may have a convex form; a concave form; a convex form at an upper portion and a concave form at a lower portion; or a concave form at the upper portion and a convex form at the lower portion. Furthermore, the protrusion 42r may have a smooth shape, which includes at least one of a convex shape, a concave shape and a planar shape in a range from the top to the spring seat 42z. A cross-section of the protrusion 42r, which is taken along a plane that includes a central axis of the inner sleeve 40, may have a continuous shape that is continuous with the sloped peripheral surface 42rc and is located in the range from the top of the protrusion 42r to the spring seat 42z, and the continuous shape may include at least one of a convex shape, a concave shape and a straight shape. In FIG. 15, the protrusion 42r may have a shape of any one of a cone, a pyramidal frustum and a pyramid besides the conical frustum.

In each of the above embodiments, there is described the example of the sleeve 20 that includes the outer sleeve 30 and the inner sleeve 40, and the spring 60 is installed in the inner sleeve 40. Alternatively, instead of providing the two sleeves, i.e., the outer sleeve 30 and the inner sleeve 40, a single sleeve may be provided, and the spring may be installed in this single sleeve.

The present disclosure is not limited to the above-described embodiments and modifications, and can be realized in various configurations within a range not deviating from the gist thereof. For example, the technical features of the embodiments and modifications corresponding to the technical features in the summary of the invention can be appropriately replaced or combined to solve a part or all of the above-mentioned disadvantages or to achieve a part of all of the above-mentioned advantages. Furthermore, if the technical feature(s) is not described as essential in the present specification, it can be appropriately deleted.

What is claimed is:

1. A hydraulic oil control valve configured to control a hydraulic oil pressure of hydraulic oil to be supplied to a valve timing adjustment device that is configured to adjust an opening timing and a closing timing of a valve of an internal combustion engine, the hydraulic oil control valve comprising:
- a sleeve that is shaped in a cylindrical tubular form, wherein an opening is formed at one end portion of the sleeve, and a spring seat is formed at another end portion of the sleeve;
- a spool that is configured to move forward and backward in an inside of the sleeve, wherein the spool is configured to adjust a supply destination of the hydraulic oil according to a positional relationship between the spool and the sleeve;
- an actuator that contacts the spool and is configured to drive the spool toward the spring seat; and
- a spring that is configured to be seated against the spring seat of the sleeve and is configured to apply a preload to the spool toward the actuator, wherein the spring has a first end portion, which has an outer diameter and an inner diameter that are set to enable the first end portion to seat against the spring seat, and a second end portion, which is spaced from the first end portion by a free length of the spring, wherein:

the sleeve has:
- a stepped portion, which surrounds the spring seat on a radially outer side of the spring seat and has a spool contact surface that is configured to limit movement of the spool toward the spring seat; and
- a protrusion, which is located at a center of the spring seat and protrudes toward the opening, wherein a maximum diameter of the protrusion is smaller than the inner diameter of the first end portion of the spring, and the protrusion has a sloped peripheral surface that has an outer diameter which is progressively reduced from one side of the sloped peripheral surface, at which the spring seat is placed, toward the opening; and
- the protrusion is configured such that in a state where the first end portion is not seated against the spring seat of the sleeve while the spring is placed adjacent to the spring seat, the first end portion is placed in contact with the protrusion.

2. The hydraulic oil control valve according to claim 1, wherein the protrusion is configured such that in a state where one end part of the first end portion contacts the stepped portion before the second end portion contacts an inner peripheral surface of the sleeve, another end part of the first end portion, which is other than the one end part of the first end portion, is placed in contact with the protrusion.

3. The hydraulic oil control valve according to claim 1, wherein:
- the outer diameter of the spring is denoted by $Dspo$;
- the free length of the spring is denoted by $Lsp$;
- an inner diameter of the sleeve is denoted by $Dsl$;
- a height, which is measured from the spring seat to the spool contact surface of the stepped portion configured to contact the spool, is denoted by $Lsl$;
- a tilt angle of a central axis of the spring relative to a line extending in a direction of gravity in a state where the first end portion contacts the stepped portion and the protrusion, is denoted by $\alpha$; and
- the protrusion is configured to satisfy both of the following two equations:

$Lsl > Dspo \cdot \sin(\alpha)$; and $Dsl > Dspo \cdot \cos(\alpha) + Lsp \cdot \sin(\alpha)$.

4. The hydraulic oil control valve according to claim 3, wherein an angle of the sloped peripheral surface relative to the spring seat is larger than the tilt angle of the central axis of the spring.

5. The hydraulic oil control valve according to claim 1, wherein a height, which is measured from the spring seat to a top of the protrusion, is less than a height, which is measured from the spring seat to the spool contact surface.

6. The hydraulic oil control valve according to claim 1, wherein a height, which is measured from the spring seat to a top of the protrusion, is equal to or higher than a height, which is measured from the spring seat to the spool contact surface.

7. The hydraulic oil control valve according to claim 1, wherein the protrusion has a shape of one of a cone, a conical frustum, a pyramid and a pyramidal frustum.

8. The hydraulic oil control valve according to claim 7, wherein the protrusion has a perpendicular surface, which is perpendicular to the spring seat and is formed to at least one of:
- one side of the protrusion, at which a top of the protrusion is placed; and
- another side of the protrusion, at which the spring seat is placed.

9. The hydraulic oil control valve according to claim 7, wherein a cross-section of the protrusion, which is taken along a plane that includes a central axis of the sleeve, has a continuous shape that is continuous with the sloped peripheral surface and is located in a range from a top of the protrusion to the spring seat, and the continuous shape includes at least one of a convex shape, a concave shape and a straight shape.

10. A valve timing adjustment device comprising the hydraulic oil control valve of claim 1.

* * * * *